United States Patent [19]
Lund

[11] Patent Number: 5,650,858
[45] Date of Patent: Jul. 22, 1997

[54] PIXEL IMAGE EDGE-SMOOTHING METHOD AND SYSTEM

[75] Inventor: Mark D. Lund, Vancouver, Wash.

[73] Assignee: Hewlett-Packard Company, Palo Alto, Calif.

[21] Appl. No.: 426,460

[22] Filed: Apr. 17, 1995

Related U.S. Application Data

[63] Continuation of Ser. No. 935,707, Aug. 26, 1992, abandoned.

[51] Int. Cl.$^6$ ............ H04N 1/40; G06K 9/62; G06K 9/40
[52] U.S. Cl. .............. 358/298; 358/455; 382/216; 382/254
[58] Field of Search .................. 358/298, 443, 358/447, 448, 454–457, 461; 395/128; 382/30, 47, 50, 54, 55, 209, 216, 254, 299

[56] References Cited

U.S. PATENT DOCUMENTS

| | | | |
|---|---|---|---|
| 4,129,860 | 12/1978 | Yonezawa et al. | 340/324 |
| 4,437,122 | 3/1984 | Walsh et al. | 358/166 |
| 4,847,641 | 7/1989 | Tung | 346/160 X |
| 5,005,139 | 4/1991 | Tung | 382/54 X |
| 5,050,000 | 9/1991 | Ng | 358/298 |
| 5,123,082 | 6/1992 | Shimada | 382/47 X |
| 5,222,159 | 6/1993 | Kawamura et al. | 382/54 X |
| 5,231,519 | 7/1993 | Koike | 358/456 |
| 5,231,677 | 7/1993 | Mita et al. | 382/54 X |
| 5,258,854 | 11/1993 | Eschbach | 358/447 X |
| 5,293,254 | 3/1994 | Eschbach | 358/456 X |
| 5,301,037 | 4/1994 | Kang et al. | 382/54 X |

FOREIGN PATENT DOCUMENTS

| | | | |
|---|---|---|---|
| A-0100872 | 2/1984 | European Pat. Off. | G09G 1/14 |
| A-0356224 | 2/1990 | European Pat. Off. | B41B 19/00 |
| A-0488534 | 6/1992 | European Pat. Off. | G06K 15/02 |
| A-0500375 | 8/1992 | European Pat. Off. | G06K 15/02 |

*Primary Examiner*—Peter S. Wong
*Assistant Examiner*—Eric Frahm

[57] ABSTRACT

Method and system for increasing the effective resolution at which a lower resolution input pixel image is printed on a higher resolution dot matrix printer such an ink-jet or laser printer are described. Illustratively, a 300-dpi by 300-dpi input pixel image is prepared at the printer for printing at 600-dpi by 600-dpi, with otherwise jagged edges appropriately smoothed to produce high print quality. Each pixel and its predefined neighboring pixels in the input image are compared to stored image templates and when a match is found, the corresponding quad pixel, or super-pixel, to be output is altered from a mere replication of the input pixel, thereby to eliminate jagged edges. Memory space in the printer is reduced by storing templates that represent only a fraction of the problem patterns, the input pixel image being reoriented between comparisons in order to account for all possible cases. If it is determined that there are gray-scaled pixels within the neighborhood surrounding and including a given pixel of the input pixel image, the corresponding super-pixel produced at the output for printing preserves the gray-scale of the original.

3 Claims, 18 Drawing Sheets

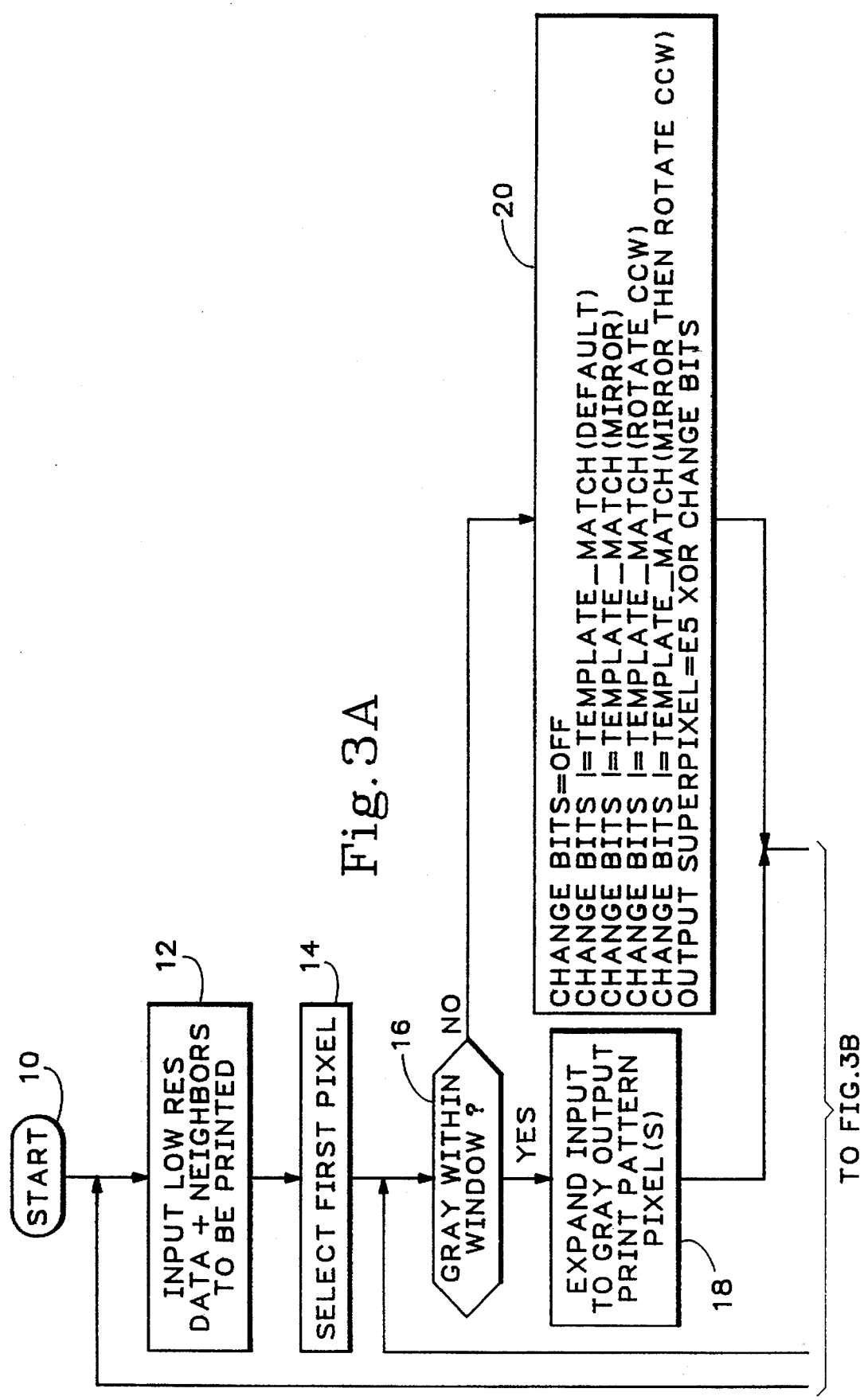

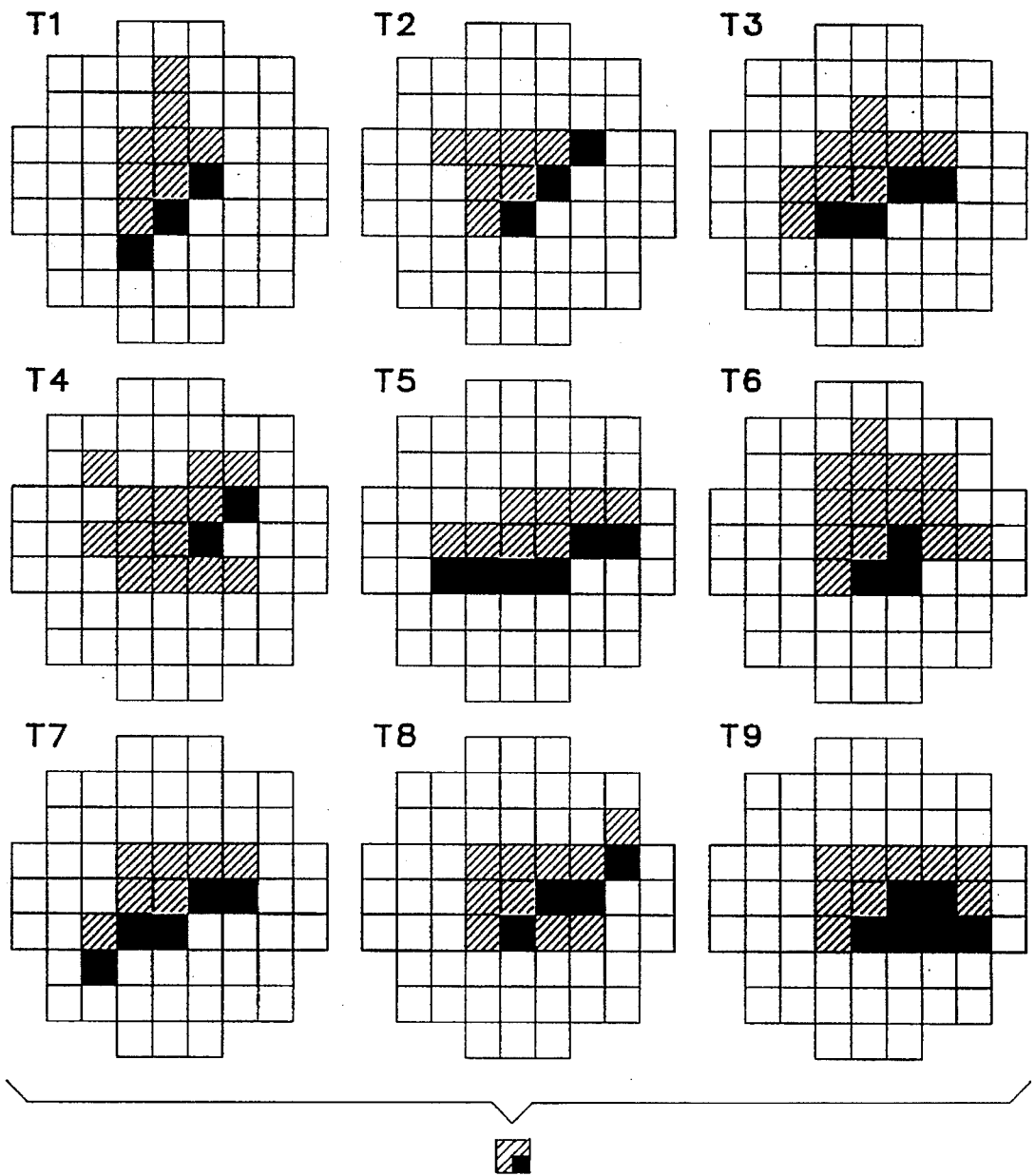
Fig. 4 A1

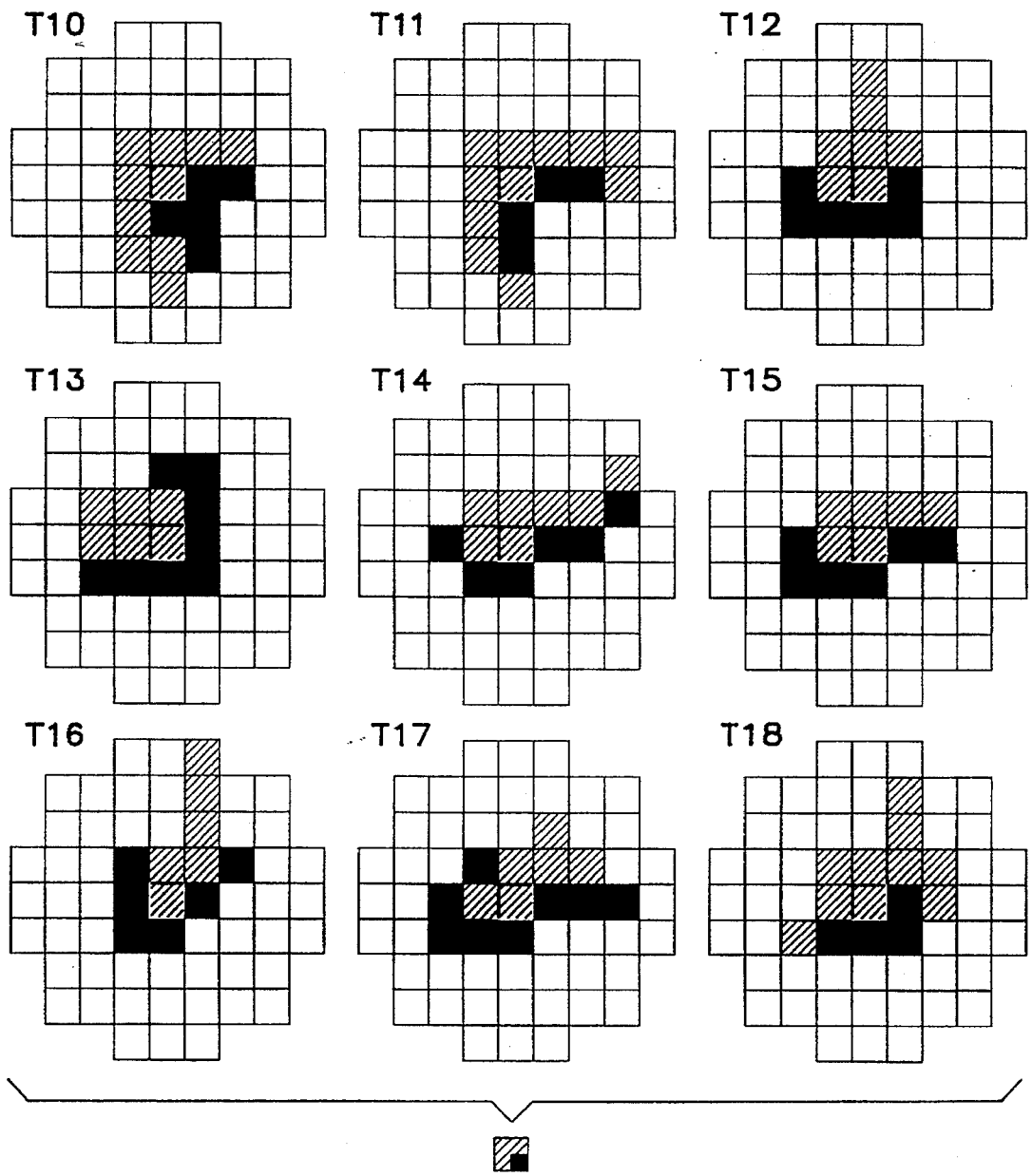
Fig. 4A2

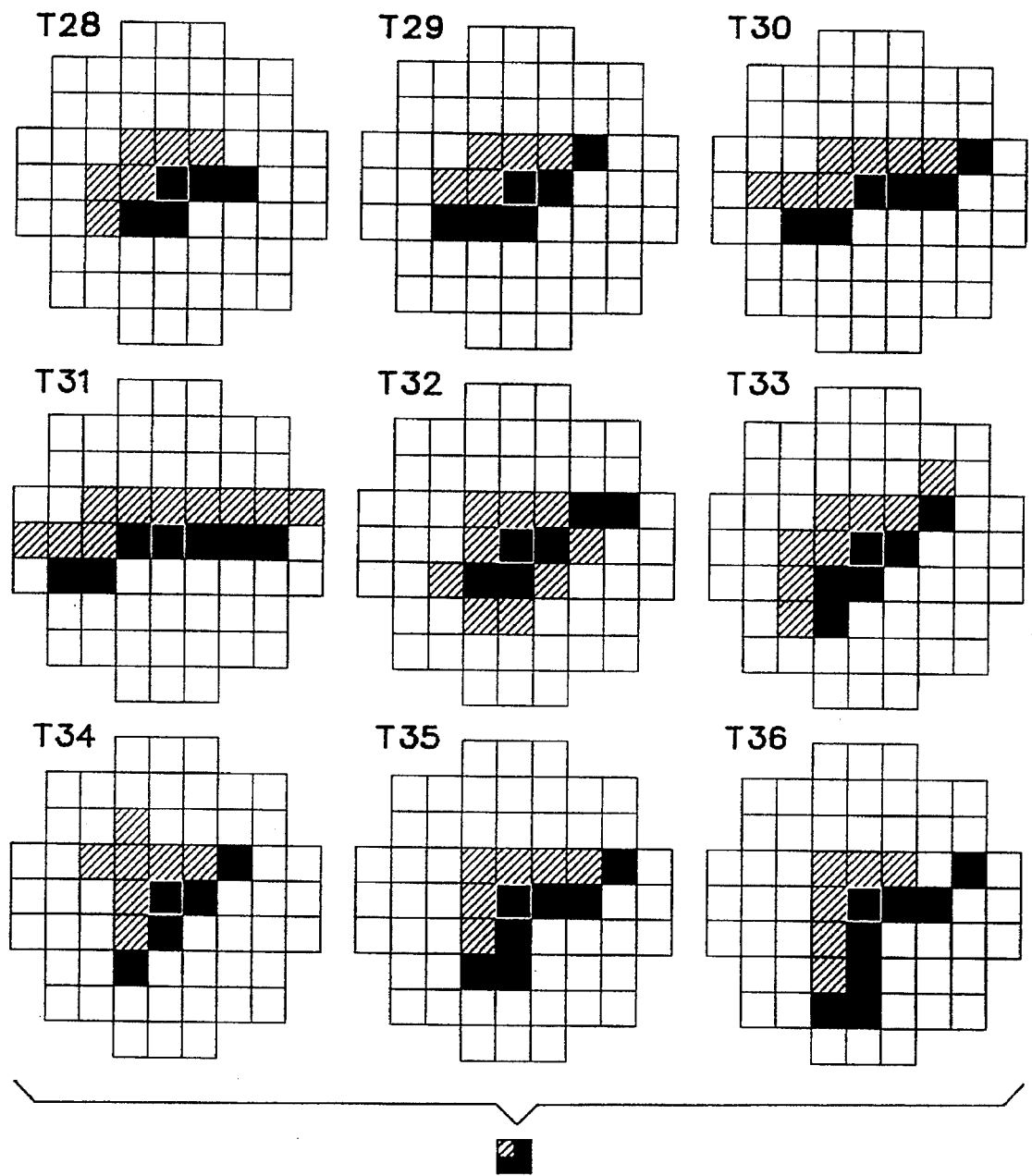
Fig. 4C1

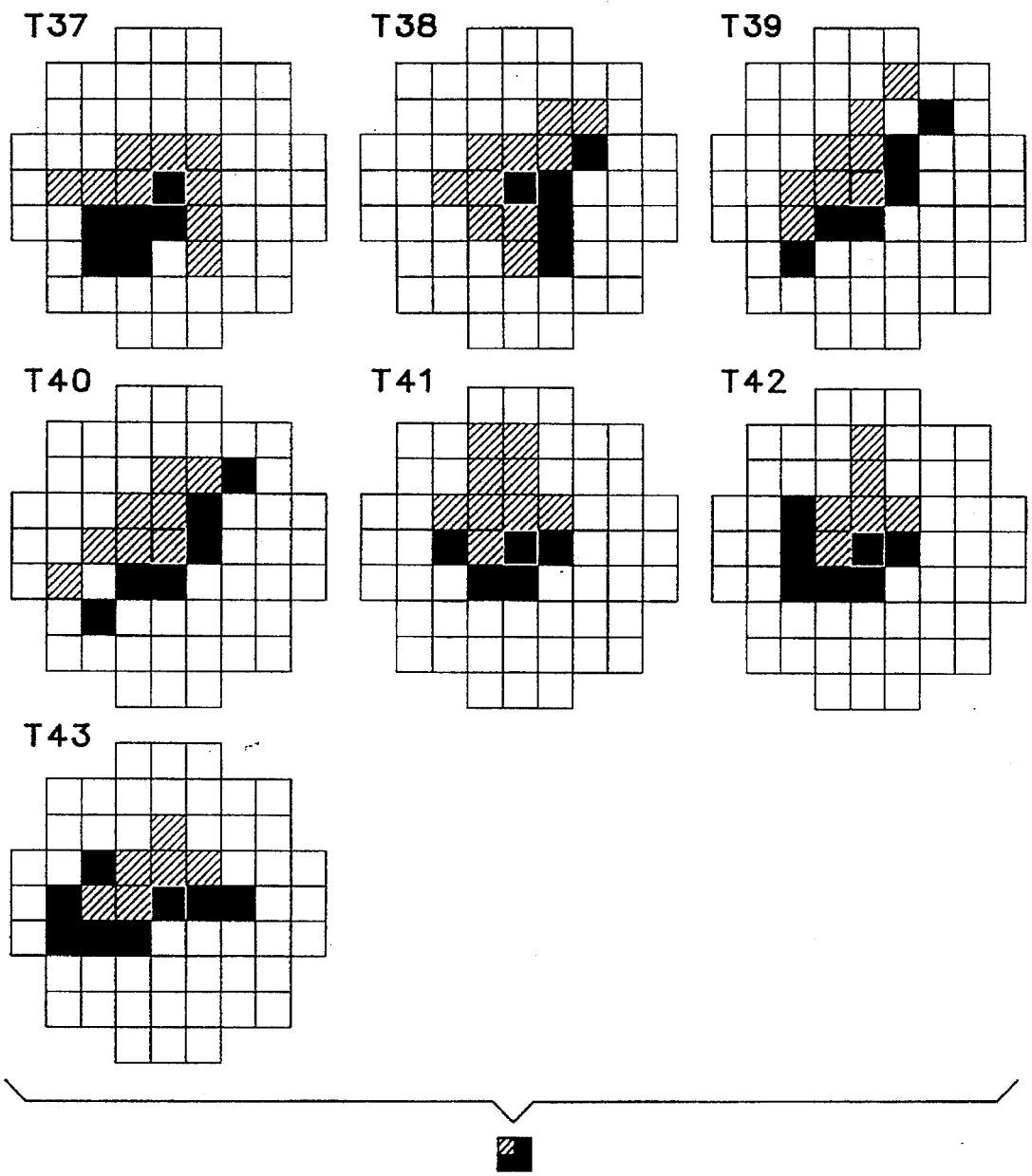
Fig. 4C2

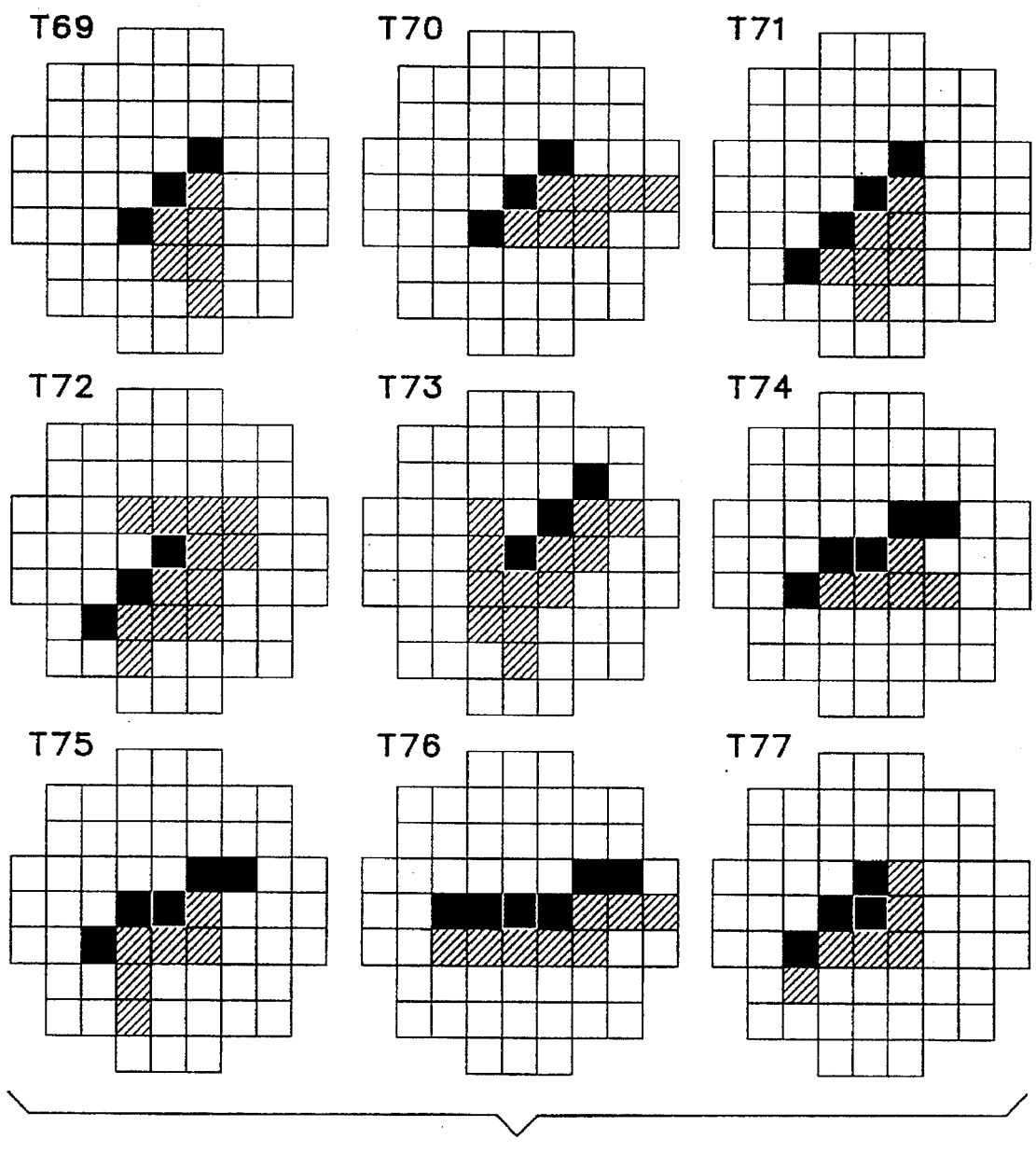
Fig. 4H1

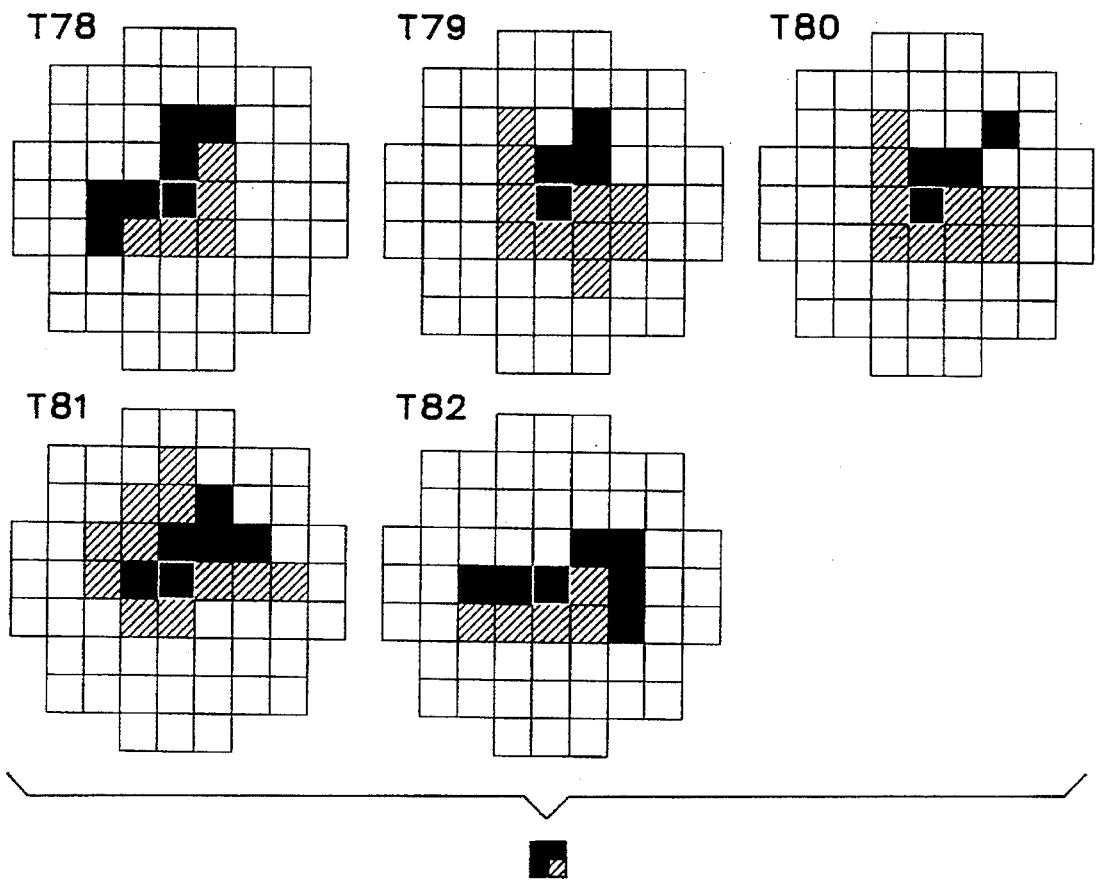
Fig. 4H2

PIXEL IMAGE EDGE-SMOOTHING METHOD AND SYSTEM

This application is a continuation of Ser. No. 07/935,707 filed Aug. 26, 1992 which is now abandoned.

TECHNICAL FIELD

This invention relates to a method and system for producing from lower resolution pixel image data bases on higher resolution output devices such as an ink-jet or laser printer an increased resolution image having smoothed edges and, more particularly, to such a method and system that accommodates input pixel images that are gray scaled, which method and system preserve in the higher resolution output image the gray scale of the input image.

This is done, e.g. in printer hardware, firmware or software, by mapping m×n dot matrix input data into m'×n' dot matrix output data (where m' is an integer multiple of m, where n' is an integer multiple of n, and where at least one of m' and n' is greater than one) and processing the output data to effect edge smoothing via stored smoothing criteria, both the mapping and the processing being accomplished without affecting any gray scale patterns within individual dots represented by input data. Illustratively herein, m and n=300 dots per inch (defining a (square) 300-dpi by 300-dpi input pixel image and an effectively doubled-resolution 600-dpi by 600-dpi output pixel image). It will be seen that the method and system are applicable generally where m and n may be the same or different and where the integer resolution multipliers may be any positive integers (at least one of which is greater than one, in order to accomplish resolution multiplication) that is compatible with desired print quality, throughput and cost goals.

BACKGROUND ART

There is a large installed base of ink-jet and laser printers having relatively lower, typically equal vertical and horizontal resolutions of 300-dpi. Recently, higher resolution printers are providing superior print quality due to their ability to produce 600-dpi resolution images. It would unduly burden the host computer that drives the higher resolution printers to require that it create 600-dpi pixel data from 300-dpi documents, applications or image databases produced thereby. Not only would such require large amounts of memory in the host, but it also would reduce 600-dpi printer throughput. Yet it is desirable to take advantage of the advent of higher resolution printers in many print applications without paying a significant throughput penalty.

SUMMARY OF THE INVENTION

In order to preserve compatibility with lower resolution applications and databases, to take advantage of the higher resolution printers and to maintain high throughput, it is desirable to perform any needed pixel image data processing at the destination printer rather than at the source computer. Thus, smart printer controllers that are capable of receiving 300-dpi image data from the computer may be used to drive either 300-dpi resolution printers (without conversion overhead) and 600-dpi (or higher) resolution printers (with minimal conversion overhead) to produce respectively lower and higher quality print results.

These goals and advantages are achieved in accordance with the preferred method and system of the invention by mapping a 300-dpi input pixel data image into a corresponding 600-dpi output pixel data image that has smoothed, rather than jagged, edges. Each input pixel is analyzed with respect to pixels in a defined neighborhood surrounding it and is mapped into a corresponding 2×2 pixel replacement having desirably smoothing characteristics relative to its context within the overall image. Such is performed by sequential comparisons with predefined input data templates representing possible jaggie-producing patterns. Regardless whether the input pixel is on or off, each of the four pixels in the corresponding output pixel quad, or what will be referred to herein as a super-pixel, may be on or off in order to preserve the 300-dpi input pixel image features, yet to smooth the 600-dpi output pixel image edges. Preferably, gray scaling of (or so-called halftones within) the lower resolution input pixel image is preserved.

BRIEF DESCRIPTION OF THE DRAWINGS

FIGS. 3A and 3B are a flowchart of the preferred method of the invention.

FIGS. 4A1, 4A2, 4B, 4C1, 4C2, 4D through 4G, and 4H1 and 4H2 schematically illustrate all of the input pattern matching templates used in accordance with the preferred method of the invention.

DETAILED DESCRIPTION OF AND BEST MODE FOR CARRYING OUT THE INVENTION

Figure 1A:
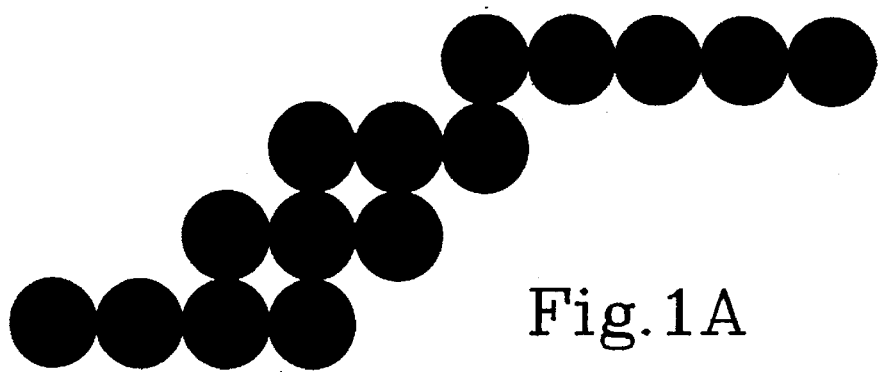
FIGS. 1A through 1D illustrate the respective inputting, doubling, smoothing and outputting steps performed in accordance with the preferred method of the invention.
Figure 1B:
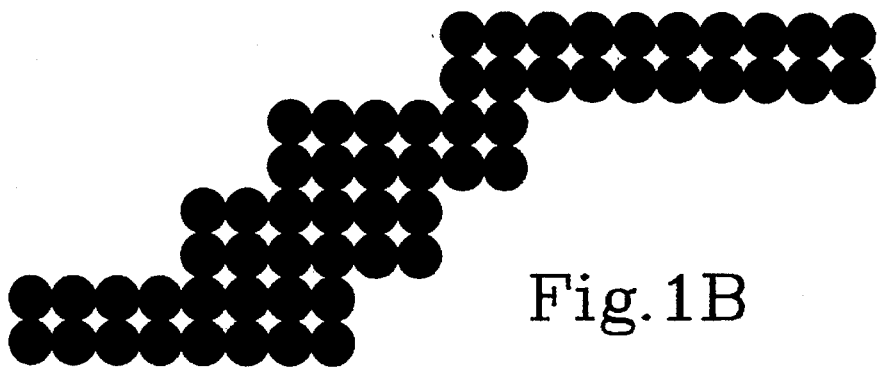

FIG. 1A represents a relatively low resolution, e.g. 300-dpi, pixel image that may be received by an ink-jet printer from a host computer over a relatively low bandwidth data communication link, for inputting to the printer's controller. FIG. 1B represents such an inputted pixel image after it has been increased, e.g. doubled, to a relatively high resolution, e.g. 600-dpi, in which each original pixel that was off has four off pixels in the corresponding super-pixel and each original pixel that was on has four on pixels in the corresponding super-pixel. Clearly from FIG. 1B, although there has been an increase in pixel resolution, there yet has been no print quality improvement, since the same jagged edges, or jaggies, of the lower resolution input pixel image are merely replicated in the higher resolution pixel image.

Figure 1C:
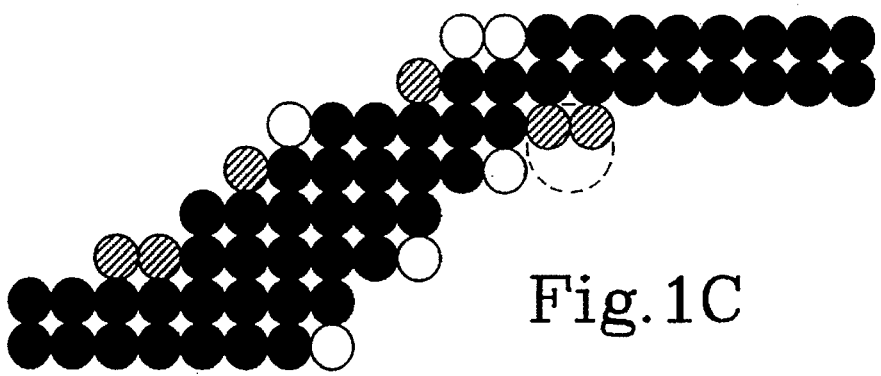
Figure 1D:
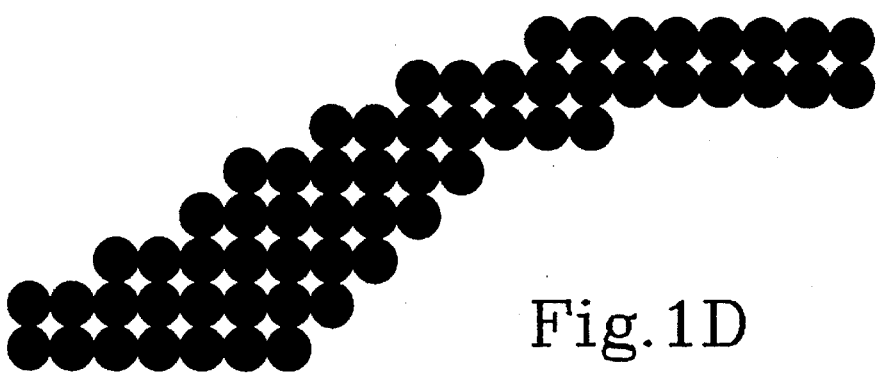

FIG. 1C represents the important edge-smoothing step in which six 600-dpi pixels effectively have been removed (indicated as blank circles) and six different 600-dpi pixels effectively have been added (indicated as shaded circles), in accordance with the preferred method of the invention. Two of the higher resolution pixels that are added by the edge smoothing step, indicated in FIG. 1C by a larger dashed circle embracing them, will be discussed in some detail by reference below to FIGS. 2A and 2B and Table 1. FIG. 1D represents the resulting higher resolution pixel image that will be printed, the image having not only increased resolution but also high-quality, smooth edges rather than the jaggies of the original, lower resolution input pixel image.

Figures 2A, 2B:
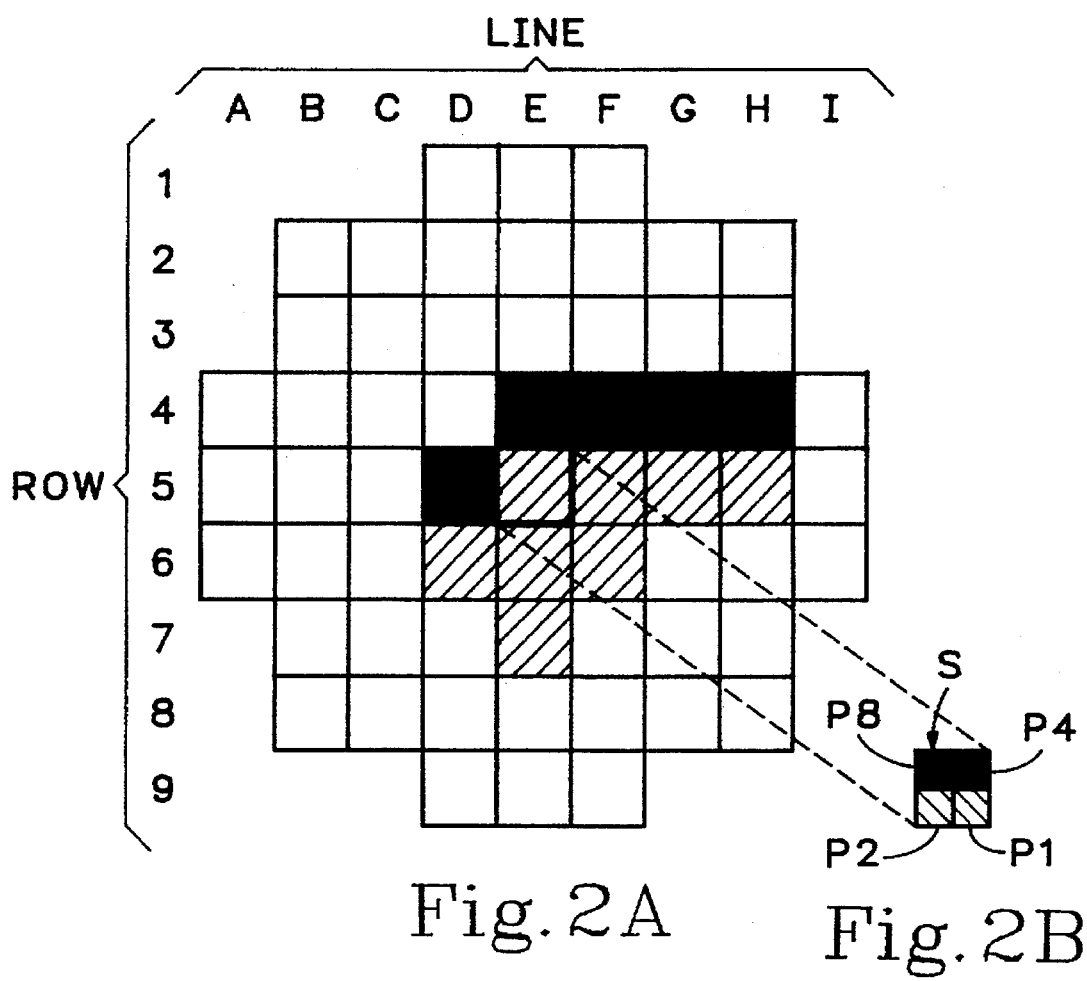
FIGS. 2A and 2B, collectively, schematically illustrate a typical one of the input pattern matching templates, which one is used to implement the doubling and smoothing steps of FIGS. 1B and 1C.

FIG. 2A will be understood to represent an input pixel image only schematically, with each square cell in the eighty-one cell array (only pertinent ones of which are shown in FIG. 2, as the remaining ones are don't cares) representing a 300-dpi pixel location that will be referenced by a concatenation of its line (alphabetic) and row (numeric) designators. For example, the central cell in the array will be referred to as the E5 cell or pixel. Pixel E5, which is broadly solidly outlined, is the input pixel that is being processed in accordance with the preferred method of the invention to determine how it will be represented by a 600-dpi super-pixel to achieve high-quality printing. The blackened and shaded cells in FIG. 2A, including cell E5, represent an input pixel pattern that preferably should be edge smoothed to produce high-quality printed output. The pattern consists of open, or blank (white) cells that represent don't cares; closed, or filled (black) cells that represent on pixels; and shaded cells that represent off pixels. It has been determined that such a pattern of on and off pixels within the illustrated window surrounding central pixel E5 represent an output or printed pixel image that would be of relatively low print quality, were there no adjustment of the higher resolution data prior to printing.

Analyzing FIG. 2A in more detail, it may be seen that if cells E4, F4, G4, H4 and D5 are on in the lower resolution input pixel image, and if cells E5, F5, G5, H5, D6, E6, F6 and E7 are off therein, then regardless of the on/off state of the remaining cells an undesirable jaggie will appear in the output unless the higher resolution pixel image is adjusted to smooth it. It has been determined that optimum smoothing of such an input pixel image, and thus high-quality print quality, is achieved when the two upper pixels in the 600-dpi super-pixel corresponding to pixel E5 are on while the lower two thereof are off, as shown by the quad pixel, or super-pixel, insert indicated at S in FIG. 2B as comprising four 600-dpi pixels P1, P2, P4, P8. Those eighty-one 300-dpi pixels within the window surrounding and including a given, centrally located pixel will be referred to herein as the central pixel's neighborhood.

There are a finite number of input pixel image patterns, a typical one of which is that shown in FIG. 2A, that must be considered in order to avoid jaggies in the higher resolution printed output. In accordance with the preferred method and system of the invention, eighty-two such patterns are represented by templates, or logical arrays of boolean variables that are on, off or masked (in the case of don't cares) to represent the various patterns. As will be seen, all such templates are compared, in each of four rotational orientations, to corresponding eight-one cell input pixel sub-images for each pixel in the input pixel image. When a match is found (each template in each of its four rotation-produced orientations is unique; while there can be multiple matches, there can be only one output super-pixel produced as a result), the super-pixel corresponding to the given pixel is re-created to have a predefined on/off quad pixel combination.

In other words, every time the neighborhood pattern shown in FIG. 2A is found in the input pixel image, the central pixel therein, i.e. pixel E5, is replaced in the 600-dpi output pixel image with the illustrated super-pixel having the upper two pixels on and the lower two off. Similarly, for each template match discovered while the input pixel image is in process, a recreation of the super-pixel corresponding with the central pixel of the original pixel image takes place that has been determined optimally to account for jaggies that otherwise diminish the quality of the higher resolution printed output. The effect is significantly improved, edge-smoothed print quality at higher resolution, with the processing overhead being borne by the printer rather than the host computer or its user. It will be appreciated that such processing readily may be performed in software, firmware, or most preferably hardware in order to impact minimally on the complexity, speed and cost of the printer and its controller.

Table 1 lists the eighty-two templates, by their defining boolean equations, that are used in accordance with the preferred method of the invention. To the left side of the equals signs in Table 1 are the numerically ordered templates T1 through T82, and to the right side thereof are the boolean combinations that correspond with each numbered template. It will be understood that the boolean variables, or terms, that are combined correspond with the logical input pixels within the neighborhood surrounding a given pixel, as illustrated in FIG. 2A. It will also be appreciated that the boolean negation (inversion: NOT) operator is designated by ¬, and that the logical AND operator is designated by ∩ in the boolean combinations. The templates represented in Table 1 have been determined empirically to produce high-quality, edge-smoothed output pixel images, although it will be understood that variations are possible that are within the scope of the invention.

TABLE 1

T1 = ¬E2 ∩ ¬E3 ∩ ¬D4 ∩ ¬E4 ∩ ¬F4 ∩ ¬D5 ∩ ¬E5 ∩ F5 ∩ ¬D6 ∩ E6 ∩ D7

T2 = ¬C4 ∩ ¬D4 ∩ ¬E4 ∩ ¬F4 ∩ G4 ∩ ¬D5 ∩ ¬E5 ∩ F5 ∩ ¬D6 ∩ E6

T3 = ¬E3 ∩ ¬D4 ∩ ¬E4 ∩ ¬F4 ∩ ¬G4 ∩ ¬C5 ∩ ¬D5 ∩ ¬E5 ∩ F5 ∩ G5 ∩ ¬C6 ∩ D6 ∩ E6

T4 = ¬C3 ∩ ¬F3 ∩ ¬G3 ∩ ¬D4 ∩ ¬E4 ∩ ¬F4 ∩ G4 ∩ ¬C5 ∩ ¬D5 ∩ ¬E5 ∩ F5 ∩ ¬D6 ∩ ¬E6 ∩ ¬F6 ∩ ¬G6

T5 = ¬E4 ∩ ¬F4 ∩ ¬G4 ∩ ¬H4 ∩ ¬C5 ∩ ¬D5 ∩ ¬E5 ∩ ¬F5 ∩ G5 ∩ H5 ∩ C6 ∩ D6 ∩ E6 ∩ F6

T6 = ¬E2 ∩ ¬D3 ∩ ¬E3 ∩ ¬F3 ∩ ¬G3 ∩ ¬D4 ∩ ¬E4 ∩ ¬F4 ∩ ¬G4 ∩ ¬D5 ∩ ¬E5 ∩ F5 ∩ ¬G5 ∩ ¬H5 ∩ ¬D6 ∩ E6 ∩ F6

T7 = ¬D4 ∩ ¬E4 ∩ ¬F4 ∩ ¬G4 ∩ ¬D5 ∩ ¬E5 ∩ F5 ∩ G5 ∩ ¬C6 ∩ D6 ∩ E6 ∩ C7

T8 = ¬H3 ∩ ¬D4 ∩ ¬E4 ∩ ¬F4 ∩ ¬G4 ∩ H4 ∩ ¬D5 ∩ ¬E5 ∩ F5 ∩ G5 ∩ ¬D6 ∩ E6 ∩ ¬F6 ∩ ¬G6

T9 = ¬D4 ∩ ¬E4 ∩ ¬F4 ∩ ¬G4 ∩ ¬H4 ∩ ¬D5 ∩ ¬E5 ∩ F5 ∩ G5 ∩ ¬H5 ∩ ¬D6 ∩ E6 ∩ F6 ∩ G6 ∩ H6

T10 = ¬D4 ∩ ¬E4 ∩ ¬F4 ∩ ¬G4 ∩ ¬D5 ∩ ¬E5 ∩ F5 ∩ G5 ∩ ¬D6 ∩ E6 ∩ F6 ∩ ¬D7 ∩ ¬E7 ∩ F7 ∩ ¬E8

T11 = ¬D4 ∩ ¬E4 ∩ ¬F4 ∩ ¬G4 ∩ ¬H4 ∩ ¬D5 ∩ ¬E5 ∩ F5 ∩ G5 ∩ ¬H5 ∩ ¬D6 ∩ E6 ∩ ¬D7 ∩ E7 ∩ ¬E8

T12 = ¬E2 ∩ ¬E3 ∩ ¬D4 ∩ ¬E4 ∩ ¬F4 ∩ C5 ∩ ¬D5 ∩ ¬E5 ∩ F5 ∩ C6 ∩ D6 ∩ E6 ∩ F6

T13 = E3 ∩ F3 ∩ ¬C4 ∩ ¬D4 ∩ ¬E4 ∩ F4 ∩ ¬C5 ∩ ¬D5 ∩ ¬E5 ∩ F5 ∩ C6 ∩ D6 ∩ E6 ∩ F6

T14 = ¬H3 ∩ ¬D4 ∩ ¬E4 ∩ ¬F4 ∩ ¬G4 ∩ H4 ∩ C5 ∩ ¬D5 ∩ ¬E5 ∩ F5 ∩ G5 ∩ D6 ∩ E6

T15 = ¬D4 ∩ ¬E4 ∩ ¬F4 ∩ ¬G4 ∩ C5 ∩ ¬D5 ∩ ¬E5 ∩ F5 ∩ G5 ∩ C6 ∩ D6 ∩ E6

T16 = ¬F1 ∩ ¬F2 ∩ ¬F3 ∩ D4 ∩ ¬E4 ∩ ¬F4 ∩ G4 ∩

TABLE 1-continued $D5 \cap \neg E5 \cap F5 \cap D6 \cap E6$ $T17 = \neg F3 \cap D4 \cap \neg E4 \cap \neg F4 \cap \neg G4 \cap C5 \cap \neg D5 \cap \neg E5 \cap F5 \cap G5 \cap H5 \cap C6 \cap D6 \cap E6$ $T18 = \neg F2 \cap \neg F3 \cap \neg D4 \cap \neg E4 \cap \neg F4 \cap \neg G4 \cap \neg D5 \cap \neg E5 \cap F5 \cap \neg G5 \cap \neg C6 \cap D6 \cap E6 \cap F6$ $T19 = \neg D4 \cap \neg E4 \cap \neg F4 \cap \neg G4 \cap \neg C5 \cap \neg D5 \cap \neg E5 \cap F5 \cap G5 \cap C6 \cap D6 \cap E6$ $T20 = \neg C4 \cap \neg D4 \cap \neg E4 \cap \neg F4 \cap G4 \cap \neg C5 \cap \neg D5 \cap \neg E5 \cap F5 \cap D6 \cap E6$ $T21 = \neg D4 \cap \neg E4 \cap \neg F4 \cap \neg G4 \cap \neg H4 \cap \neg B5 \cap \neg C5 \cap \neg D5 \cap E5 \cap F5 \cap G5 \cap C6 \cap D6$ $T22 = \neg D4 \cap \neg E4 \cap \neg F4 \cap \neg G4 \cap \neg B5 \cap \neg C5 \cap \neg D5 \cap \neg E5 \cap F5 \cap C6 \cap D6 \cap E6$ $T23 = \neg D4 \cap \neg E4 \cap \neg F4 \cap \neg G4 \cap \neg C5 \cap \neg D5 \cap \neg E5 \cap F5 \cap \neg G5 \cap D6 \cap E6 \cap \neg F6 \cap \neg G6 \cap \neg F7$ $T24 = B4 \cap \neg C4 \cap \neg D4 \cap \neg E4 \cap \neg F4 \cap \neg G4 \cap B5 \cap \neg C5 \cap \neg D5 \cap E5 \cap F5 \cap G5 \cap B6 \cap C6 \cap D6$ $T25 = \neg G3 \cap \neg H3 \cap \neg D4 \cap \neg E4 \cap \neg F4 \cap \neg G4 \cap H4 \cap \neg D5 \cap E5 \cap F5 \cap G5 \cap H5 \cap \neg D6 \cap \neg E6 \cap \neg F6 \cap G6$ $T26 = \neg E3 \cap \neg C4 \cap \neg D4 \cap \neg E4 \cap \neg F4 \cap \neg G4 \cap \neg D5 \cap E5 \cap \neg F5 \cap G5 \cap C6 \cap D6 \cap E6 \cap F6 \cap G6$ $T27 = \neg E3 \cap \neg C4 \cap \neg D4 \cap \neg E4 \cap \neg F4 \cap \neg G4 \cap \neg C5 \cap D5 \cap \neg E5 \cap F5 \cap C6 \cap D6 \cap E6 \cap F6 \cap G6$ $T28 = \neg D4 \cap \neg D4 \cap \neg F4 \cap \neg C5 \cap \neg D5 \cap E5 \cap F5 \cap G5 \cap \neg C6 \cap D6 \cap E6$ $T29 = \neg D4 \cap \neg E4 \cap \neg F4 \cap G4 \cap \neg C5 \cap \neg D5 \cap E5 \cap F5 \cap C6 \cap D6 \cap E6$ $T30 = \neg D4 \cap \neg E4 \cap \neg F4 \cap \neg G4 \cap H4 \cap \neg B5 \cap \neg C5 \cap \neg D5 \cap E5 \cap F5 \cap G5 \cap C6 \cap D6$ $T31 = \neg C4 \cap \neg D4 \cap \neg E4 \cap \neg F4 \cap \neg G4 \cap \neg H4 \cap \neg I4 \cap \neg A5 \cap \neg B5 \cap \neg C5 \cap \neg D5 \cap E5 \cap F5 \cap G5 \cap H5 \cap B6 \cap C6$ $T32 = \neg D4 \cap \neg E4 \cap \neg F4 \cap G4 \cap H4 \cap \neg D5 \cap \neg D7 \cap \neg E7$ $T33 = \neg G3 \cap \neg D4 \cap \neg E4 \cap \neg F4 \cap G4 \cap \neg C5 \cap \neg D5 \cap E5 \cap F5 \cap \neg C6 \cap D6 \cap E6 \cap \neg C7 \cap D7$ $T34 = \neg D3 \cap \neg C4 \cap \neg D4 \cap \neg E4 \cap \neg F4 \cap G4 \cap \neg D5 \cap E5 \cap F5 \cap \neg D6 \cap E6 \cap D7$ $T35 = \neg D4 \cap \neg E4 \cap \neg F4 \cap \neg G4 \cap H4 \cap \neg D5 \cap E5 \cap F5 \cap G5 \cap \neg D6 \cap E6 \cap D7 \cap E7$ $T36 = \neg D4 \cap \neg E4 \cap \neg F4 \cap H4 \cap \neg D5 \cap E5 \cap F5 \cap G5 \cap \neg D6 \cap E6 \cap \neg D7 \cap E7 \cap D8 \cap E8$ $T37 = \neg D4 \cap \neg E4 \cap \neg F4 \cap \neg B5 \cap \neg C5 \cap \neg D5 \cap E5 \cap F5 \cap C6 \cap D6 \cap E6 \cap \neg F6 \cap C7 \cap D7 \cap \neg F7$ $T38 = \neg F3 \cap \neg G3 \cap \neg D4 \cap \neg E4 \cap \neg F4 \cap G4 \cap \neg C5 \cap \neg D5 \cap E5 \cap F5 \cap \neg D6 \cap \neg E6 \cap F6 \cap \neg E7 \cap F7$ $T39 = \neg F2 \cap \neg E3 \cap G3 \cap \neg D4 \cap \neg E4 \cap F4 \cap \neg C5 \cap \neg D5 \cap \neg E5 \cap F5 \cap \neg C6 \cap D6 \cap E6 \cap C7$ $T40 = \neg E3 \cap \neg F3 \cap G3 \cap \neg D4 \cap \neg E4 \cap F4 \cap \neg C5 \cap \neg D5 \cap \neg E5 \cap F5 \cap \neg B6 \cap D6 \cap E6 \cap \neg C7$ $T41 = \neg D2 \cap \neg E2 \cap \neg D3 \cap \neg E3 \cap \neg C4 \cap \neg D4 \cap \neg E4 \cap \neg F4 \cap C5 \cap \neg D5 \cap E5 \cap F5 \cap Dy \cap E6$ $T42 = \neg E2 \cap \neg E3 \cap C4 \cap \neg D4 \cap \neg E4 \cap \neg F4 \cap C5 \cap \neg D5 \cap E5 \cap F5 \cap C6 \cap D6 \cap E6$ $T43 = \neg E3 \cap C4 \cap \neg D4 \cap \neg E4 \cap \neg F4 \cap B5 \cap \neg C5 \cap \neg D5 \cap E5 \cap F5 \cap G5 \cap B6 \cap C6 \cap D6$ $T44 = D4 \cap E4 \cap F4 \cap \neg G4 \cap D5 \cap \neg E5 \cap \neg F5 \cap \neg G5 \cap \neg D6 \cap E6 \cap \neg F6 \cap \neg G6 \cap \neg E7$ $T45 = E4 \cap F4 \cap G4 \cap \neg H4 \cap D5 \cap \neg E5 \cap \neg F5 \cap \neg G5 \cap \neg H5 \cap \neg D6 \cap \neg E6 \cap \neg F6 \cap \neg E7$ $T46 = D4 \cap E4 \cap F4 \cap G4 \cap H4 \cap I4 \cap C5 \cap \neg D5 \cap \neg E5 \cap \neg F5 \cap \neg G5 \cap \neg H5 \cap \neg C6 \cap \neg D6 \cap \neg E6 \cap \neg D7$ $T47 = \neg F2 \cap \neg F3 \cap E4 \cap \neg F4 \cap C5 \cap D5 \cap \neg E5 \cap \neg F5 \cap B6 \cap \neg C6 \cap \neg D6 \cap \neg E6$ $T48 = E4 \cap F4 \cap G4 \cap \neg H4 \cap C5 \cap D5 \cap \neg E5 \cap \neg F5 \cap \neg G5 \cap \neg H5 \cap B6 \cap \neg C6 \cap \neg D6 \cap \neg E6 \cap \neg F6$ $T49 = G3 \cap E4 \cap F4 \cap \neg G4 \cap D5 \cap \neg E5 \cap \neg F5 \cap D6 \cap \neg E6 \cap \neg F6 \cap \neg G6 \cap C7 \cap \neg D7 \cap \neg F7$ $T50 = \neg D3 \cap E3 \cap F3 \cap \neg C4 \cap \neg D4 \cap E4 \cap F4 \cap \neg G4 \cap \neg C5 \cap D5 \cap \neg E5 \cap \neg F5 \cap \neg G5 \cap \neg C6 \cap \neg D6 \cap \neg E6 \cap \neg F6$ $T51 = E3 \cap \neg F3 \cap E4 \cap \neg F4 \cap C5 \cap D5 \cap \neg E5 \cap \neg F5 \cap \neg C6 \cap \neg D6 \cap \neg E6 \cap \neg F6$ $T52 = \neg E2 \cap D3 \cap \neg E3 \cap \neg F3 \cap D4 \cap E4 \cap \neg F4 \cap D5 \cap \neg E5 \cap \neg F5 \cap \neg D6 \cap \neg E6 \cap \neg F6 \cap \neg G6 \cap \neg F7$ $T53 = D4 \cap E4 \cap F4 \cap \neg H4 \cap D5 \cap \neg E5 \cap \neg F5 \cap \neg G5 \cap D6 \cap \neg E6 \cap \neg F6 \cap \neg D7 \cap \neg E7$ $T54 = \neg D3 \cap \neg E3 \cap \neg C4 \cap \neg D4 \cap E4 \cap F4 \cap \neg G4 \cap \neg C5 \cap D5 \cap \neg E5 \cap \neg F5 \cap \neg G5 \cap \neg C6 \cap \neg D6 \cap \neg E6 \cap \neg F6$ $T55 = \neg C4 \cap \neg D4 \cap \neg E4 \cap \neg F4 \cap \neg B5 \cap \neg C5 \cap D5 \cap E5 \cap \neg F5 \cap C6 \cap D6 \cap E6 \cap \neg F6 \cap C7 \cap \neg D7 \cap \neg E7 \cap \neg F7 \cap \neg C8$ $T56 = E4 \cap F4 \cap G4 \cap H4 \cap D5 \cap \neg E5 \cap \neg F5 \cap \neg G5 \cap \neg H5 \cap \neg D6 \cap \neg E6 \cap \neg F6 \cap \neg E7$ $T57 = E4 \cap F4 \cap G4 \cap H4 \cap B5 \cap C5 \cap D5 \cap \neg E5 \cap \neg F5 \cap \neg G5 \cap \neg H5 \cap \neg B6 \cap \neg C6 \cap \neg D6 \cap \neg E6 \cap \neg F6$ $T58 = F4 \cap B5 \cap C5 \cap D5 \cap E5 \cap \neg F5 \cap \neg G5 \cap \neg C6 \cap \neg D6 \cap \neg E6 \cap \neg F6$ $T59 = F4 \cap G4 \cap C5 \cap D5 \cap E5 \cap \neg F5 \cap \neg G5 \cap \neg C6 \cap \neg D6 \cap \neg E6 \cap \neg F6$ $T60 = G3 \cap F4 \cap \neg G4 \cap D5 \cap E5 \cap \neg F5 \cap C6 \cap \neg D6 \cap \neg E6 \cap \neg F6 \cap \neg G6$ $T61 = G3 \cap F4 \cap \neg G4 \cap D5 \cap E5 \cap \neg F5 \cap C6 \cap \neg D6 \cap \neg E6 \cap \neg F6 \cap \neg D7 \cap \neg D8$ $T62 = C4 \cap D4 \cap E4 \cap F4 \cap F4 \cap C5 \cap \neg D5 \cap E5 \cap \neg F5 \cap \neg C6 \cap \neg D6 \cap \neg E6 \cap \neg F6 \cap \neg G6 \cap \neg E7$ $T63 = C4 \cap D4 \cap E4 \cap F4 \cap G4 \cap D5 \cap \neg E5 \cap F5 \cap \neg G5 \cap \neg C6 \cap \neg D6 \cap \neg E6 \cap \neg F6 \cap \neg G6 \cap \neg E7$

TABLE 1-continued

T64 = F4 ∩ C5 ∩ D5 ∩ E5 ∩ ¬F5 ∩ ¬G5 ∩ B6 ∩ ¬C6 ∩ ¬D6 ∩ ¬E6 ∩ ¬F6

T65 = G3 ∩ F4 ∩ ¬G4 ∩ C5 ∩ D5 ∩ E5 ∩ ¬F5 ∩ ¬G5 ∩ ¬C6 ∩ ¬D6 ∩ ¬E6 ∩ ¬F6

T66 = ¬F2 ∩ ¬D3 ∩ ¬E3 ∩ ¬F3 ∩ G3 ∩ ¬D4 ∩ E4 ∩ F4 ∩ G4 ∩ ¬D5 ∩ E5 ∩ F5 ∩ ¬G5 ∩ ¬H5 ∩ ¬D6 ∩ ¬E6 ∩ ¬F6 ∩ ¬G6

T67 = ¬E2 ∩ ¬F2 ∩ ¬D3 ∩ ¬E3 ∩ F3 ∩ ¬D4 ∩ E4 ∩ F4 ∩ ¬D5 ∩ E5 ∩ F5 ∩ ¬D6 ∩ ¬E6 ∩ F6 ∩ ¬E4 ∩ ¬F7

T68 = ¬D3 ∩ ¬E3 ∩ ¬F3 ∩ ¬G3 ∩ H3 ∩ ¬D4 ∩ E4 ∩ F4 ∩ G4 ∩ H4 ∩ ¬D5 ∩ E5 ∩ F5 ∩ G5 ∩ H5 ∩ ¬D6 ∩ ¬E6 ∩ F6 ∩ G6 ∩ ¬H6 ∩ ¬E7 ∩ ¬F7 ∩ ¬G7 ∩ ¬H7

T69 = F4 ∩ E5 ∩ ¬F5 ∩ D6 ∩ ¬E6 ∩ ¬F6 ∩ ¬E7 ∩ ¬F7 ∩ ¬F8

T70 = F4 ∩ E5 ∩ ¬F5 ∩ ¬G5 ∩ ¬H5 ∩ ¬I5 ∩ D6 ∩ ¬E6 ∩ ¬F6 ∩ ¬G6

T71 = F4 ∩ E5 ∩ ¬F5 ∩ D6 ∩ ¬E6 ∩ ¬F6 ∩ C7 ∩ ¬D7 ∩ ¬E7 ∩ ¬F7 ∩ ¬E8

T72 = ¬D4 ∩ ¬E4 ∩ ¬F4 ∩ ¬G4 ∩ E5 ∩ ¬F5 ∩ ¬G5 ∩ D6 ∩ ¬E6 ∩ ¬F6 ∩ C7 ∩ ¬D7 ∩ ¬E7 ∩ ¬F7 ∩ ¬D8

T73 = G3 ∩ ¬D4 ∩ F4 ∩ ¬G4 ∩ ¬H4 ∩ ¬D5 ∩ E5 ∩ ¬F5 ∩ ¬G5 ∩ ¬D6 ∩ ¬E6 ∩ ¬F6 ∩ ¬D7 ∩ ¬E7 ∩ ¬E8

T74 = F4 ∩ G4 ∩ D5 ∩ E5 ∩ ¬F5 ∩ C6 ∩ ¬D6 ∩ ¬E6 ∩ ¬F6 ∩ ¬G6

T75 = F4 ∩ G4 ∩ D5 ∩ E5 ∩ ¬F5 ∩ C6 ∩ ¬D6 ∩ ¬E6 ∩ ¬F67 ∩ ¬D7 ∩ ¬D8

T76 = G4 ∩ H4 ∩ C5 ∩ D5 ∩ E5 ∩ F5 ∩ ¬G5 ∩ ¬H5 ∩ ¬I5 ∩ ¬C6 ∩ ¬D6 ∩ ¬E6 ∩ ¬F6 ∩ ¬G6

T77 = E4 ∩ ¬F4 ∩ D5 ∩ E5 ∩ ¬F5 ∩ C6 ∩ ¬D6 ∩ ¬E6 ∩ ¬F6 ∩ ¬C7

T78 = E3 ∩ F3 ∩ E4 ∩ ¬F4 ∩ C5 ∩ D5 ∩ E5 ∩ ¬F5 ∩ C6 ∩ ¬D6 ∩ ¬E6 ∩ ¬F6

T79 = ¬D3 ∩ F3 ∩ ¬D4 ∩ E4 ∩ F4 ∩ ¬D5 ∩ E5 ∩ ¬F5 ∩ ¬G5 ∩ ¬D6 ∩ ¬E6 ∩ ¬F6 ∩ ¬G6 ∩ ¬F7

T80 = ¬D3 ∩ G3 ∩ ¬D4 ∩ E4 ∩ F4 ∩ ¬D5 ∩ E5 ∩ ¬F5 ∩ ¬G5 ∩ ¬D6 ∩ ¬E6 ∩ ¬F6 ∩ ¬G6

T81 = ¬E2 ∩ ¬D3 ∩ ¬E3 ∩ F3 ∩ ¬C4 ∩ ¬D4 ∩ E4 ∩ F4 ∩ G4 ∩ ¬C5 ∩ D5 ∩ E5 ∩ ¬F5 ∩ ¬G5 ∩ ¬H5 ∩ ¬D6 ∩ ¬E6

T82 = F4 ∩ G4 ∩ C5 ∩ D5 ∩ E5 ∩ ¬F5 ∩ G5 ∩ ¬C6 ∩ ¬D6 ∩ ¬E6 ∩ ¬F6 ∩ G6

Persons skilled in the art will appreciate that the number of templates and their particular patterns have been empirically determined to provide high quality, psuedo-600-dpi output in a variety of print applications. The templates defined by the equations listed in Table 1 are believed to represent an optimal approach to edge smoothing that accommodates the various, and often competing, goals of 1) preserving stroke weight to the extent possible; 2) minimizing shifts in input pixel image features, and, when shifting is necessary, shifting features minimally (never more than a single 600-dpi pixel width) and in the same direction; 3) smoothing character fonts in such manner that curves, intersections, endpoints and serifs are accurately reproduced; and 4) preserving the gray-scaled inputs, or halftones, of graphic or pictorial pixel images.

It may be seen from Table 1 that T56 (which is the template illustrated in FIG. 2A that produces the dashed outline super-pixel of FIG. 1C), represents a case where in the input pixel image, pixels E4, F4, G4, H4 and D5 are on and pixels E5, F5, G5, H5, D6, E6, F6 and F7 are off. Because the remaining logical input pixels do not affect the edge-smoothing determination, they are don't cares and thus do not appear as terms in the combination for T56. It is a straightforward matter selectively to change—from their replicate initial state derived from the pixel to which they correspond—the logical pixels in the output super-pixel shown in FIG. 2B by implementing the boolean logic equations listed below in Table 2, the inputs of which are boolean variables indicating for each of the templates whether or not the input pixel image matched the template, wherein ∪ designates the logical OR operator:

TABLE 2

CHANGE_P8 = T21 ∪ T24 ∪ T25 ∪ T26 ∪ T28 ∪ T29 ∪ T30 ∪ T31 ∪ T32 ∪ T33 ∪ T34 ∪ T35 ∪ T36 ∪ T37 ∪ T38 ∪ T41 ∪ T42 ∪ T43 ∪ T44 ∪ T45 ∪ T46 ∪ T47 ∪ T48 ∪ T49 ∪ T50 ∪ T51 ∪ T52 ∪ T53 ∪ T54 ∪ T56 ∪ T57 ∪ T63

CHANGE_P4 = T21 ∪ T24 ∪ T25 ∪ T26 ∪ T39 ∪ T40 ∪ T55 ∪ T56 ∪ T57 ∪ T63

CHANGE_P2 = T19 ∪ T20 ∪ T22 ∪ T23 ∪ T27 ∪ T39 ∪ T40 ∪ T58 ∪ T59 ∪ T60 ∪ T61 ∪ T62 ∪ T64 ∪ T65 ∪ T66 ∪ T67 ∪ T68

CHANGE_P1 = T1 ∪ T2 ∪ T3 ∪ T4 ∪ T5 ∪ T6 ∪ T7 ∪ T8 ∪ T9 ∪ T10 ∪ T11 ∪ T12 ∪ T13 ∪ T14 ∪ T15 ∪ T16 ∪ T17 ∪ T18 ∪ T19 ∪ T20 ∪ T22 ∪ T23 ∪ T27 ∪ T39 ∪ T40 ∪ T58 ∪ T59 ∪ T60 ∪ T61 ∪ T62 ∪ T64 ∪ T65 ∪ T69 ∪ T70 ∪ T71 ∪ T72 ∪ T73 ∪ T74 ∪ T75 ∪ T76 ∪ T77 ∪ T78 ∪ T79 ∪ T80 ∪ T81 ∪ T82

It will be appreciated that the CHANGE_P8 equation defines whether upper left pixel P8 of the quad is to be toggled, or changed; the CHANGE_P4 equation defines whether upper right pixel P4 is to be changed; the CHANGE_P2 equation defines the same for lower left pixel P2; and the CHANGE_P1 equation for lower right pixel P1. For example, and referring momentarily again to FIGS. 2A and 2B, a match with template T56 sets T56 high. Thus, CHANGE_P8 and CHANGE_P4 will be high, while CHANGE P2 and CHANGE P1 will be low, by the solution of the above equations. This corresponds to upper left and right pixels P8, P4 in quad, or super-pixel, S being toggled, or changed from their original off state to an on state, and lower left and right pixels P2, P1 being left in their original off state, as in FIG. 2B.

Although only eight-two templates are listed in Table 1, and referenced in the above equations, it will be appreciated that there are actually 328 input pixel image patterns that may be matched (twelve of which are duplicates in the implementation described herein). In other words, for each low-resolution pixel that is processed, there are 328 pattern-matching rules that must be applied in determining the high-resolution pixel to be printed. In order to reduce the circuit complexity that would be required to implement all 328 rules, the remaining cases are accommodated in accordance with the preferred method of the invention by successive reorientations of the input pixel image relative to the eight-two templates, which reorientations preferably are performed in hardware.

By orienting the input pixel image in four different ways, e.g. 1) standard, 2) mirrored about the y-axis, 3) rotated counter-clockwise (CCW) and 4) mirrored about the y-axis and then rotated CCW, relative to the input pixel image, and by determining for each successive input pixel image orientation whether the input pixel image matches the eighty-two templates, all 328 possible matches are considered, yet only eighty-two templates, or pattern-matching boolean combinations need be implemented. Taking advantage of what may be thought of as the four-way symmetry of the neighboring pixels' impact on smoothing with respect to one centered therein represents an important advantage in the cost and complexity of the solution proposed herein.

Figure 5:
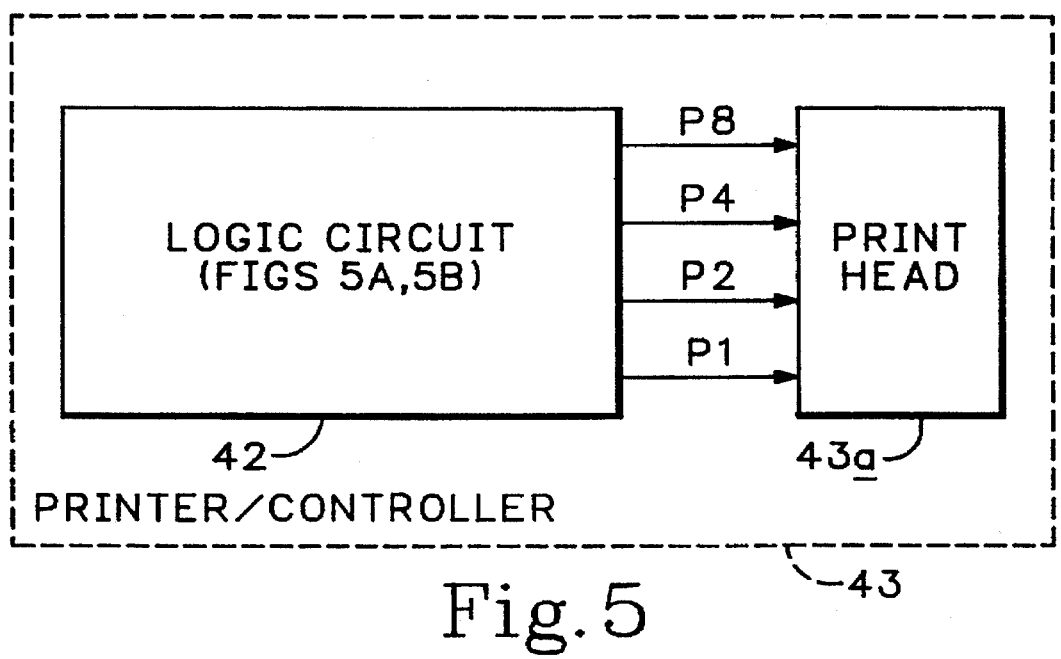
FIG. 5 is a simplified block diagram of a printer/controller that implements the method of the invention.
Figure 5A:
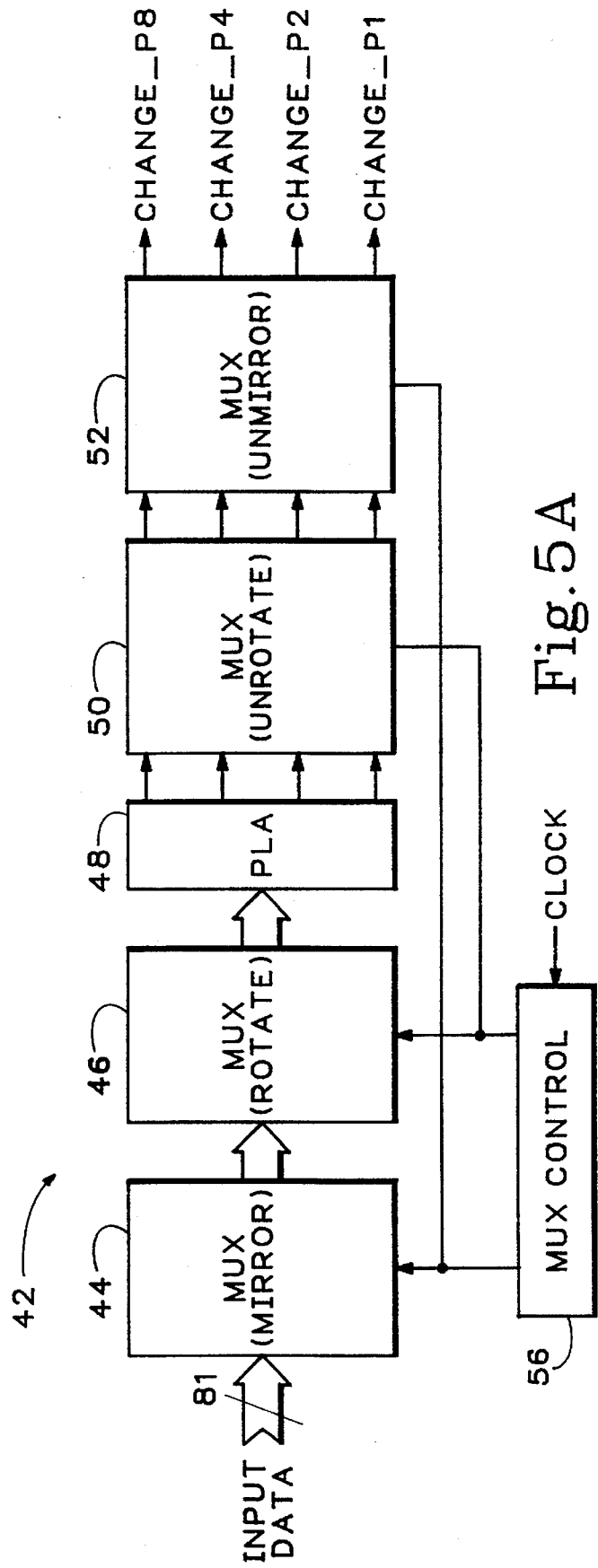
FIGS. 5A and 5B are a simplified block diagram of the logic circuit of FIG. 5.
Figure 5B:
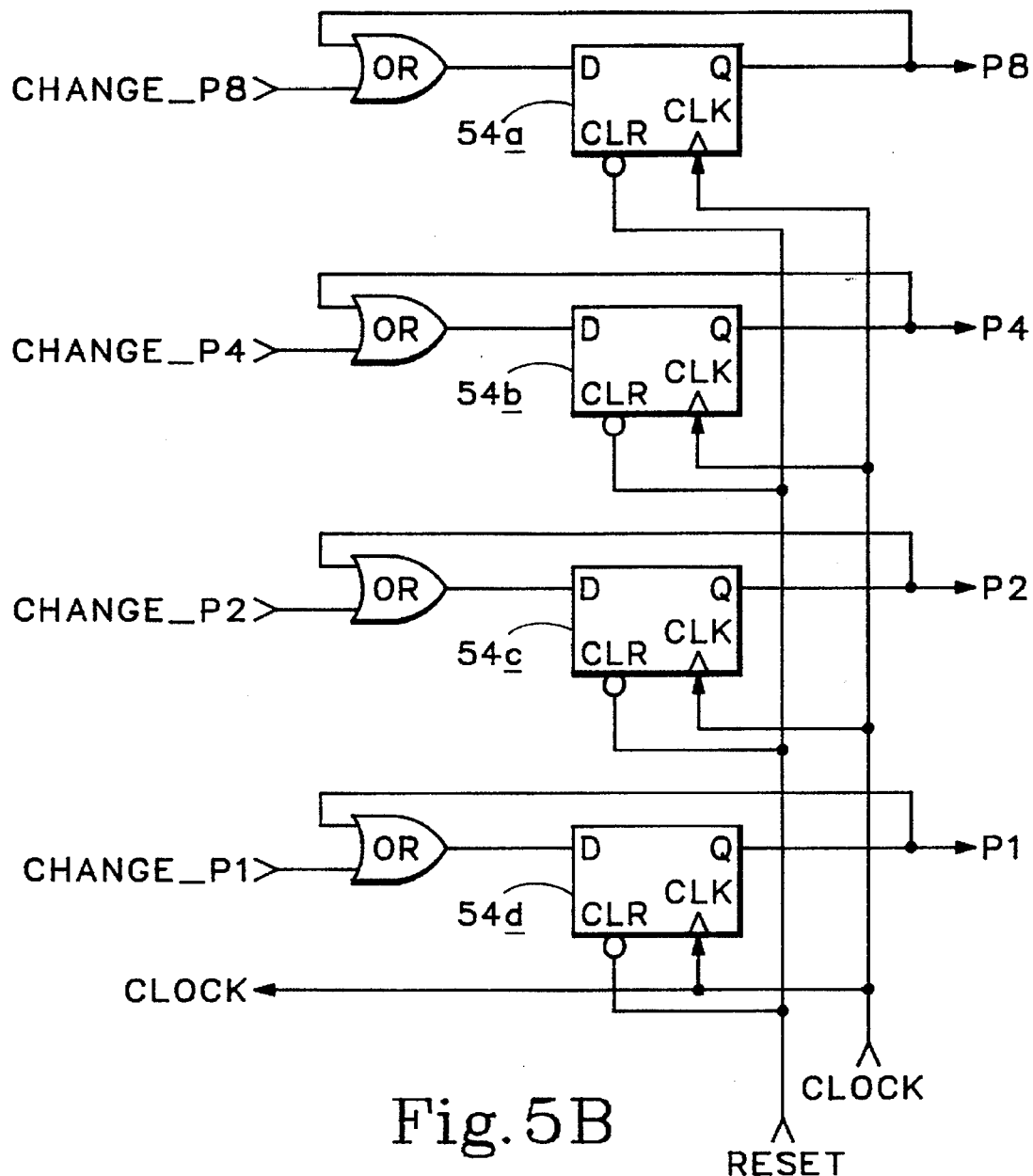

It will be appreciated that alternative methods may be used, e.g. the templates, instead of the input pixel image, could be reoriented, although the preferred method by which the input pixel image is reoriented permits the templates to be implemented conveniently in a hardware PLA, as will be seen by reference to FIGS. 5A and 5B. Essentially, the preferred method and system may be thought of as effecting reorientation of either the input pixel image or the template relative to the other.

The invention may be summarized as follows: The invented dot matrix pixel image gray scale-preserving edge smoothing printer system preferably includes an input pixel image, e.g. that of FIG. 2A, of a first predefined resolution, e.g. 300-dpi by 300-dpi, wherein a given pixel in the input pixel image, e.g. a central one therein, has a predefined on/off state and an associated shading factor; a memory-based output pixel image, e.g. that shown in FIG. 2B, of a second predefined resolution, e.g. 600-dpi by 600-dpi, that is an integral multiple greater than one, e.g. two, times the first predefined resolution in one or more axes; and a processor, e.g. the described combinatorial and sequential logic circuit described above, for analyzing the given pixel in the input pixel image and a predefined number, e.g. eighty, of neighboring pixels generally surrounding the given pixel in the input pixel image, thereby to produce and output pixel image, e.g. an image consisting of multiple, arrayed super-pixels such as super-pixel S in FIG. 2B, that is of multiplied resolution and that is smoother than the input pixel image.

Preferably, the processor determines the present on/off state of each of the neighboring pixels and establishes in a corresponding set of a greater number of higher resolution pixels, e.g. the four 600-dpi by 600-dpi pixels of super-pixel S in FIG. 2B, of the output pixel image their on/off state as a predefined function of the current on/off state of the given pixel. As will be seen more clearly by reference to FIG. 3, the processor also establishes shading factors associated with each of the pixels of the output pixel image that agree with the shading factor associated with the given pixel, such that any pixels of the set that have associated on/off states which agree with the on/off state of the given pixel have the same shading factor as that of the given pixel. Thus, the gray scale of the input pixel image is preserved in gray-scaled regions, but is resolution-multiplied and edge-smoothed in regions having no gray scale data.

Another way of describing the invention is to see it as a low-resolution to high-resolution pixel image processor for use with ink-jet or laser printers. Such a processor by the description above includes a logic circuit receiving data which represent a given low-resolution input pixel image window containing a given pixel, e.g. the window and central pixel of FIG. 2A, with the circuit effecting a comparison between (1) pixels within such low-resolution window and (2) a predefined set of plural pixel image patterns. The circuit may be understood to produce a set of multiple output signals which represent the predefined states of a high resolution pixel image, e.g. super-pixel S of FIGS. 2A and 2B, corresponding with such given pixel in accordance with such comparison. Such output signals would drive an ink-jet or laser printhead to produce a high-resolution pixel image corresponding with such low-resolution input pixel image window. Importantly, there is a predetermined correlation between the on/off states of the multiple pixels within the high-resolution pixel image and the on/off state of the given pixel that effects smoothing of the low-resolution input pixel image. This is as described above with reference to template T56 of FIG. 2A.

Figure 3B:
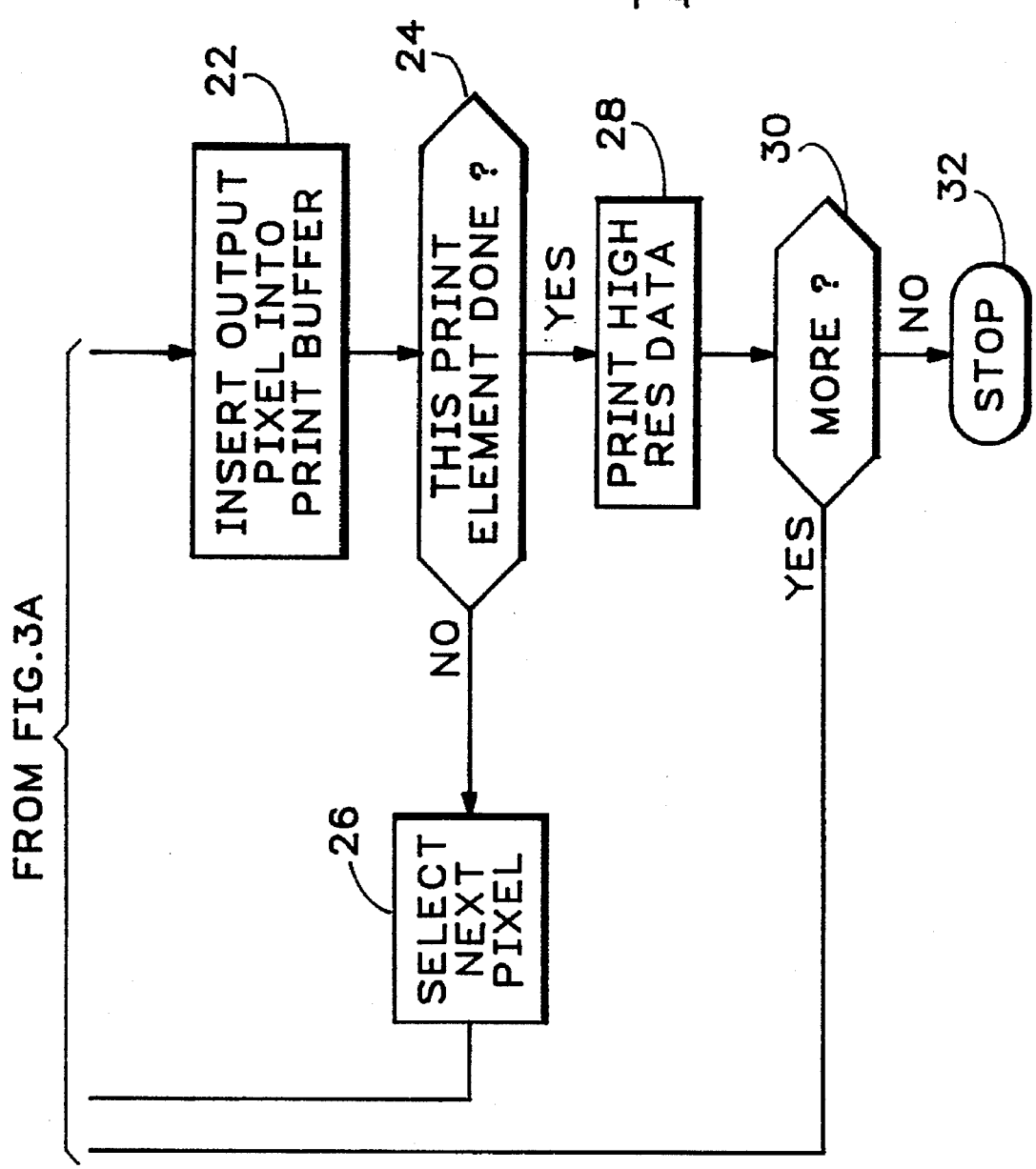
Figure 4B:
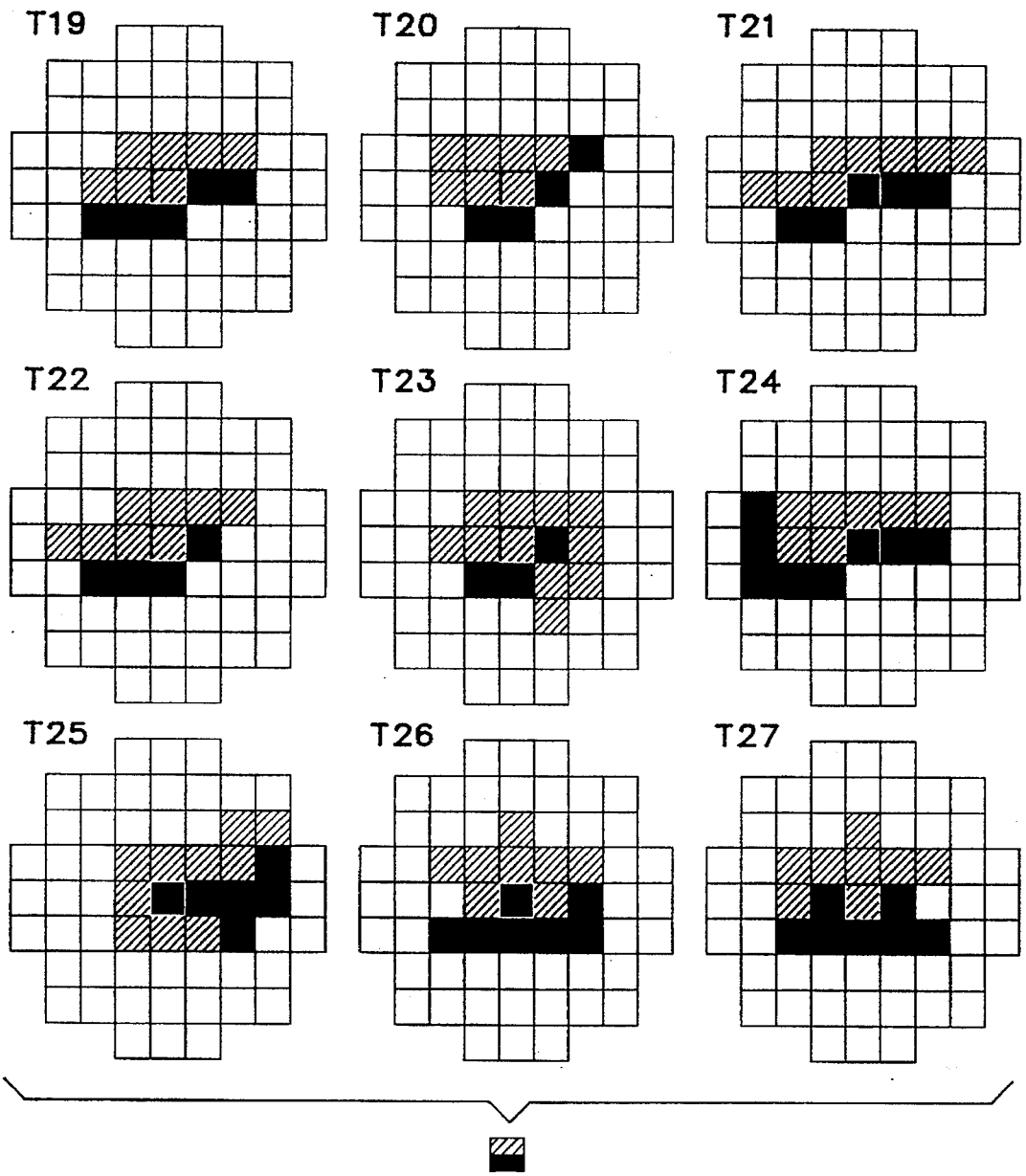
Figure 4D:
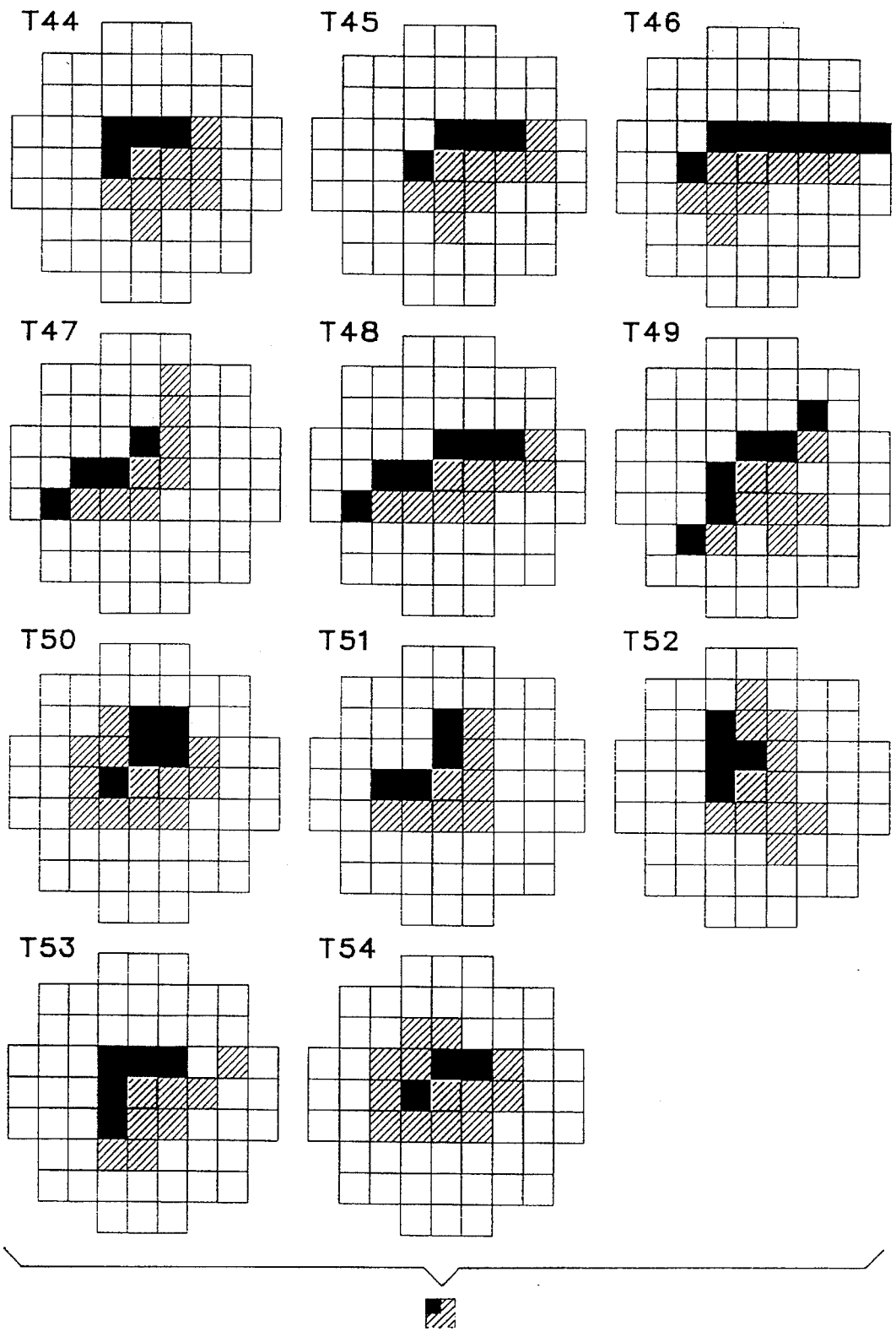
Figure 4E:
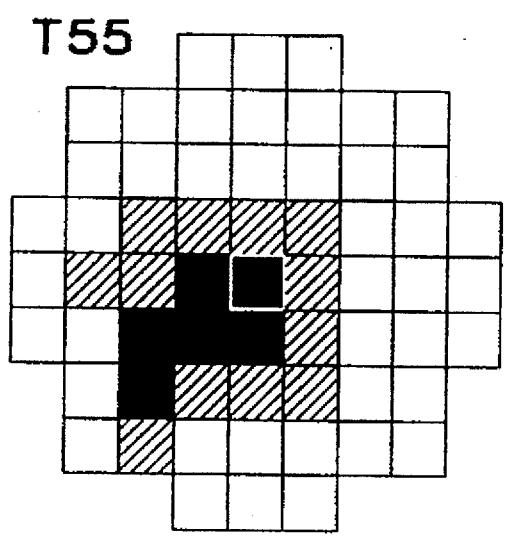
Figure 4E:
Figure 4F:
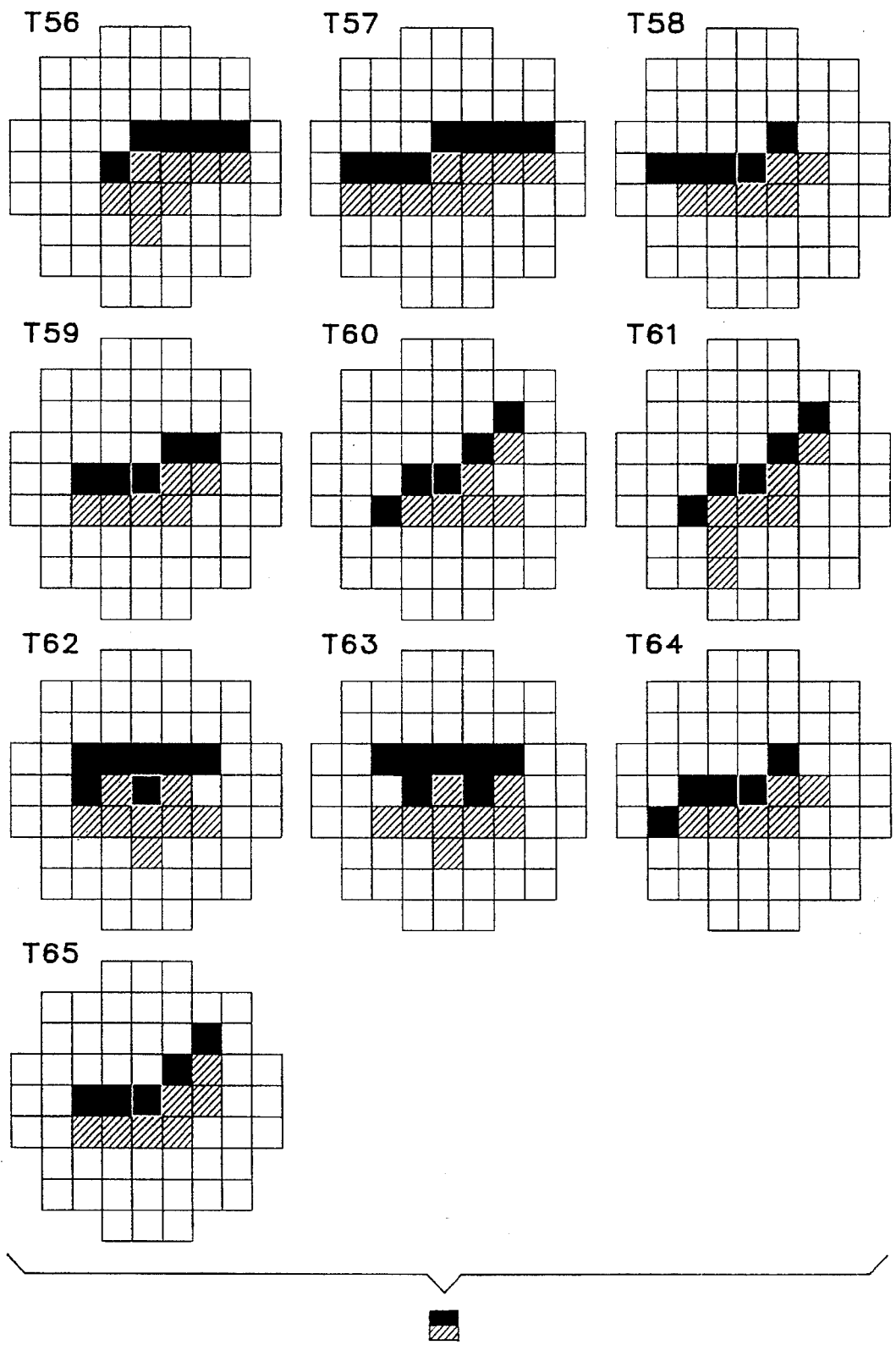
Figure 4G:
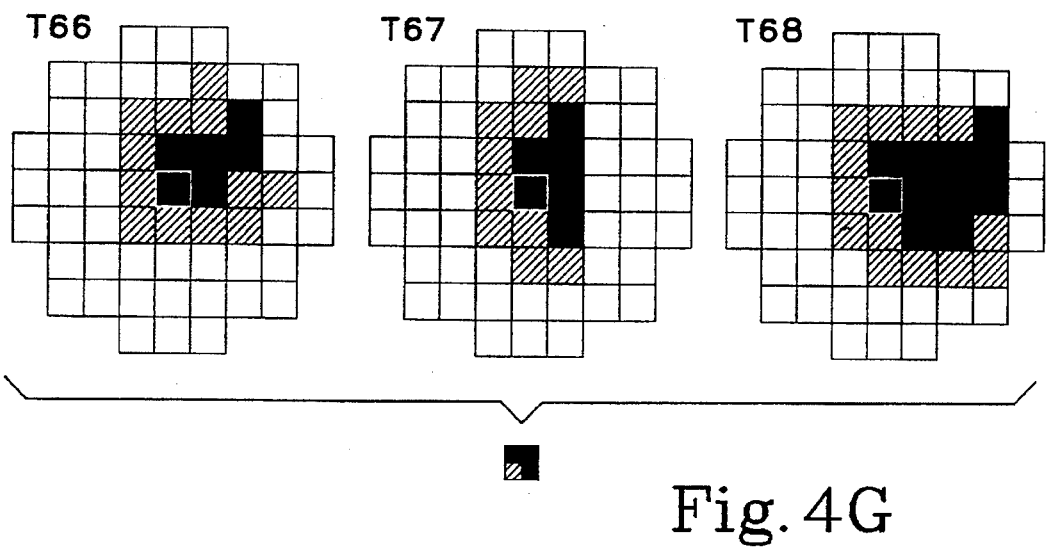

Turning now collectively to FIGS. 3A and 3B, a logic flowchart will be seen to illustrate the preferred method of the invention. The input pixel image resolution-multiplying method that is illustrated in FIGS. 3A and 3B is for use in a printer having a relatively high resolution, e.g. 600-dpi by 600-dpi, wherein the input image resolution from the host computer is relatively lower than that of the printer. Starting at 10, the method includes first inputting at 12 the low-resolution (LOW RES) pixel image data within the neighborhood to be printed to the printer or printer controller. It will be appreciated that such input data can represent columnar pixel data destined for a vertical printhead, an entire raster of pixel data, a partial page of pixel data or even a full page of pixel data to be printed. Advantageously, in accordance with the preferred method and system of the invention, such low-resolution input pixel data within the defined neighborhood requires no large pixel data buffering. This is because, as will be seen, the input pixel data are expanded and optionally smoothed on the fly at a rate that does not impact the printer's throughput.

The method further includes at 14 selecting a first, or given, pixel such as the central one within the neighborhood. Because the input pixel image data of the lower resolution may be gray scaled, it is determined at 16 whether there is any such gray scale data within a defined window. Preferably, such defined window includes an immediate neighboring pixel set around the given pixel defined by the template as being either on or off (don't cares are not considered as being within such defined window). If so, the first or given pixel to be produced at the high resolution within such a window is merely expanded, e.g. doubled, in resolution at 18 into a gray, or shaded, output print pattern pixel or plural pixels set, whereby no smoothing and thus no halftone image distortion or loss of contrast therefrom occurs. Accordingly, in the case of gray-scaled data within the defined input pixel data window, wherein such window preferably is smaller than the entire 81-pixel neighborhood, the plural-pixel image that is produced at the higher resolution is such that the gray scale of the input pixel image data of the lower resolution is preserved.

If there is no gray within the defined window, then mapping of the first or given pixel may be seen from FIGS. 3A and 3B at 20 to include preferably, for each singular pixel within the input pixel data, comparing the pixel data neighboring the singular pixel in their various orientations with plural, predefined pixel data templates, thereby to determine whether a predefined correlation exists therebetween. In such case as a correlation exists, as indicated by one or more template matches at 20 (as represented by the series of CHANGE BITS 1=TEMPLATE MATCH (DEFAULT/ MIRROR/ROTATE CCW/MIRROR THEN ROTATE CCW) constructs by which the result(s) of any matches with the templates are logically accumulated or summed), the method further comprises producing thereat for the singular pixel a plural-pixel image, e.g. super-pixel S, (as represented by the OUTPUT SUPER-PIXEL-E5 XOR (exclusive OR) CHANGE BITS logical construct) at the higher resolution in accordance with a uniquely defined smoothing substitution plural-pixel image associated with such case.

The method further includes inserting at 22 the output super-pixel, whether produced at 18 or at 20, into a print buffer and determining at 24 whether the physical print element's data have all been expanded. If not, then at 26 the next low-resolution input pixel (which becomes the next given pixel) is selected and the above steps 16 and 18 or 20 are repeated. If the print element's data all have been expanded, then at 28 the high-resolution (HIGH RES) data is printed. It will be appreciated that printing at 28 the produced plural-pixel image at the higher resolution effects edge smoothing of the pixel image of the higher resolution in the printed output. So long as there is more low-resolution input pixel data to be processed, as may be indicated at 30, subsequent input pixel image data identically are processed beginning at 12. When there is no more data, of course, input pixel image data processing stops at 32.

Briefly, FIGS. 4A1, 4A2, 4B, 4C1, 4C2, 4D through 4G, and 4H1 and 4H2 schematically represent the 82 templates that are used in the resolution-multiplying and edge-smoothing method and system of the invention, and the output super-pixels produced thereby. Above the bracket in each figure are the templates to which input pixel image data are compared (in each of their various defined orientations), and below the bracket in each figure is the corresponding super-pixel produced in the case of a match. It will be appreciated that templates T1 through T82 correspond with the template equations listed above in Table 1. The pattern-matching templates are included herein for the sake of completeness, as it is believed that they aid in understanding the numerous input pixel images that, were they not edge-smoothed, as in accordance with the invented method and system, would produce an undesirably lower print quality.

Referring finally to FIGS. 5, 5A and 5B, it will be appreciated that, in accordance with the preferred embodiment of the invention—in which hardware processing of input pixels into output super-pixels is performed by a hardware processor, or logic circuit, 42 within a printer or printer controller indicated schematically and in dashed lines at 43 as "PRINTER/CONTROLLER" (the primer having a printhead shown schematically and in dashed lines at 43a) input pixel image orientation and reorientation may be accomplished combinatorially by the use of plural two-to-one multiplexers (MUXs) 44, 46 that effectively produce combinations of one or more of (left-to-right) mirroring and (CCW) rotation of the input pixel image data in a four-cycle clocking sequence. Further, it will be appreciated that preferably the logic for the template matching may be accomplished combinatorially by the use of a programmed logic array (PLA) 48 which is coupled with MUXs 44, 46.

The outputs of PLA 48 are first "unrotated" (actually, rotated in the reverse, clockwise direction) and then unmirrored, respectively, by MUXs 50, 52 to produce CHANGE_P8, CHANGE_P4, CHANGE_P2, CHANGE_P1 at the outputs of MUX 52. It will be appreciated that output super-pixels S may be produced (synchronously) by RESETting and then CLOCKing a four-bit latch or D flip-flop array 54a, 54b, 54c, 54d, between successive input pixel image orientations. The D flip-flop inputs as shown are the logical OR of their outputs and the orientation-restored CHANGE_P8, CHANGE_P4, CHANGE_P2, CHANGE_P1 outputs of PLA 48 that implements the logic equations listed in Table 2. Finally, a MUX gating CONTROL circuit 56 operated synchronously with the CLOCK signal controls the succession of input pixel image orientations by MUXs 44, 46, 50, 52. Of course, alternative implementations, whether hardware, firmware or software are within the scope of the invention.

INDUSTRIAL APPLICABILITY

The method and system of the invention enable higher resolution ink-jet or laser printers to produce higher resolution (e.g. 600-dpi by 600-dpi) pixel images from lower resolution (e.g. 300-dpi by 300-dpi) pixel image data received from a host computer over a lower bandwidth communications link, wherein the higher resolution printed output has smoothed edges and what otherwise would be jagged features. By mapping the lower resolution input pixel image into a higher resolution output pixel image in such manner that the latter has smoothed edges, a high quality print image is provided at relatively low complexity and cost and without burdening either the host computer or the communication link with higher processing and communication bandwidths, and without reducing system throughput. Compatibility with lower resolution document scanners and image data bases is maintained.

The method and system are not limited to 300-dpi to 600-dpi mapping and smoothing symmetrically along vertical and horizontal axes, but instead are general in their applicability to any system requiring backwards compatibility in existing installations and yet greatly improving print quality in systems where a higher resolution printer is available. Image data bases containing gray-scaling yet may be printed, substantially without loss of feature definition, contrast or tone, by the provision of selective edge smoothing while a lower resolution input image is mapped into a higher resolution output pixel image. The preferred implementation of the method and system yet are cost effective, and require only modest memory and processing power in the printer controller. This is accomplished by using plural templates to define edge-smoothing-difficult patterns against which are matched sequentially reoriented input pixel neighborhoods including each of the given low resolution input pixels. Such avoids the redundancy that would be occasioned if every troublesome input possibility required a corresponding stored template.

While the preferred method and system of the invention, as well as the best mode for carrying out the invention, have been described, variations may be made without departing from the spirit of the invention.

I claim:

1. An input pixel image resolution-multiplying method for use in an ink-jet or laser printer having a first resolution, an input pixel image having a second resolution which is lower than the first resolution, the input pixel image being defined by input pixel data of the second resolution, wherein the input pixel data may have associated therewith a gray scale, the method comprising the steps of:

at the ink-jet or laser printer, mapping the input pixel data of the second resolution into a pixel image on the first resolution, said mapping step including for each singular pixel therein comparing pixel data that neighbors said singular pixel with plural predefined pixel data templates to determine whether a predefined correlation exists therebetween and if so then substituting for said singular pixel a predefined plural-pixel image characterized as having the first resolution, wherein said substituting is performed so that the gray scale of the input pixel image of the second resolution is preserved and wherein said mapping includes successively comparing said templates with successively rotationally reoriented versions of said pixel data that neighbors said singular pixel, and printing said substituted plural-pixel image at said first resolution, thereby to effect edge smoothing of the pixel image of the first resolution.

2. A low-resolution to high-resolution pixel image processor for use with printers comprising:

a logic circuit receiving data representing a given low-resolution input pixel image window containing a given pixel characterized by an on/off state, said circuit effecting a comparison between pixels within the low-resolution window and a predefined set of plural pixel image patterns, said circuit producing a set of multiple output signals that represent predefined states of multiple pixels within a high-resolution pixel image corresponding with the given pixel in accordance with the comparison, said set of multiple output signals driving a printhead to produce a high-resolution pixel image corresponding with the low-resolution input pixel image window, wherein there is a predetermined correlation between an on/off state characterizing each of the multiple pixels within the high-resolution pixel image and the on/off state of the given pixel that effects edge-smoothing of the low-resolution input pixel image, wherein said logic circuit includes a multiplexer and a programmed logic array coupled therewith, and wherein said logic circuit is operated synchronously with a clock signal to effect plurality instances of such effected comparisons, with a rotational reorientation, between such plural effected comparisons, of said pixels within the given low-resolution input pixel image window relative to said image patterns.

3. An input pixel image resolution-multiplying method for use in an ink-jet or laser printer having a first resolution, an input pixel image having a lower resolution than the first resolution, the input pixel image being defined by input pixel data having a lower resolution than that of the ink-jet or laser printer, wherein the input pixel data may have associated therewith a gray scale, the method comprising the steps of:

selecting a given pixel of the input pixel image and defining a window that includes the given pixel and a set of immediately neighboring pixels;

determining whether any pixel within the window has associated therewith a gray scale and if so then expanding the lower resolution of each pixel within the defined window to produce a gray-scaled pixel image of multiplied resolution and if not then mapping the given pixel into a predefined plural-pixel image of the first resolution, wherein said mapping is performed by comparing each pixel within the defined window that neighbor the given pixel with plural predefined pixel templates to determine whether a predefined correlation exits therebetween and if so then substituting for the given pixel the predefined plural-pixel image of the first resolution, thereby to produce a pixel image of the first resolution while preserving the gray scale of the input pixel image.

* * * * *